(12) United States Patent
Abagyan et al.

(10) Patent No.: US 7,880,738 B2
(45) Date of Patent: Feb. 1, 2011

(54) STRUCTURED DOCUMENTS AND SYSTEMS, METHODS AND COMPUTER PROGRAMS FOR CREATING, PRODUCING AND DISPLAYING THREE DIMENSIONAL OBJECTS AND OTHER RELATED INFORMATION IN THOSE STRUCTURED DOCUMENTS

(75) Inventors: Ruben Abagyan, La Jolla, CA (US);
Eugene Raush, San Diego, CA (US);
Maxim Totrov, San Diego, CA (US);
Levon Budagyan, La Jolla, CA (US);
Andrew J. W. Orry, San Diego, CA (US)

(73) Assignee: Molsoft LLC, San Diego, CA (US)

( * ) Notice: Subject to any disclaimer, the term of this patent is extended or adjusted under 35 U.S.C. 154(b) by 29 days.

(21) Appl. No.: 11/457,795

(22) Filed: Jul. 14, 2006

(65) Prior Publication Data

US 2007/0016853 A1    Jan. 18, 2007

Related U.S. Application Data

(60) Provisional application No. 60/700,043, filed on Jul. 14, 2005, provisional application No. 60/807,475, filed on Jul. 14, 2006.

(51) Int. Cl.
*G06T 17/00* (2006.01)
*G06T 15/70* (2006.01)
*G06F 3/048* (2006.01)

(52) U.S. Cl. .................. 345/420; 345/473; 715/848

(58) Field of Classification Search .................. None
See application file for complete search history.

(56) References Cited

U.S. PATENT DOCUMENTS

| 4,600,919 | A | 7/1986 | Stern |
| 4,961,154 | A | 10/1990 | Pomerantz et al. |
| 4,982,338 | A | 1/1991 | Fujita |
| 5,110,297 | A | 5/1992 | Teague |
| 5,121,324 | A | 6/1992 | Rini et al. |
| 5,157,736 | A | 10/1992 | Boyer et al. |
| 5,175,616 | A | 12/1992 | Milgram et al. |
| 5,229,935 | A | 7/1993 | Yamagishi et al. |

(Continued)

OTHER PUBLICATIONS

Adobe PDF Reference Archives, PDF Reference, Fifth Edition, version 1.6, (Nov. 2004), http://www.adobe.com/devnet/pdf/pdf_reference_archive.html; various pages.*

(Continued)

*Primary Examiner*—Daniel F Hajnik
(74) *Attorney, Agent, or Firm*—Michael P. Eddy

(57) ABSTRACT

A structured document file which includes graphical and non graphical information. The graphical information includes the vector and coordinate description of a representation of at least one three dimensional object and at least one of the following group of view attributes or features: rotation, translation, view angle, lighting, colors, specific graphical representations, labels and parameters. The vector and coordinate description are stored with or independently from the one or more view attributes or features and the vector and coordinate description and the one or more view attributes are stored in a single file which can be accessed and viewed by a structured document viewer. Related authoring tools and viewers are also disclosed.

28 Claims, 20 Drawing Sheets

U.S. PATENT DOCUMENTS

| | | |
|---|---|---|
| 5,237,647 A | 8/1993 | Roberts et al. |
| 5,249,137 A | 9/1993 | Wilson et al. |
| 5,276,785 A | 1/1994 | Mackinlay et al. |
| 5,280,569 A | 1/1994 | Tsujido |
| 5,287,435 A | 2/1994 | Cohen et al. |
| 5,365,370 A | 11/1994 | Hudgins |
| 5,386,507 A | 1/1995 | Teig et al. |
| 5,469,535 A | 11/1995 | Jarvis et al. |
| 5,490,240 A | 2/1996 | Foran et al. |
| 5,495,576 A | 2/1996 | Ritchey |
| 5,504,845 A | 4/1996 | Vecchione |
| 5,555,366 A * | 9/1996 | Teig et al. .................. 711/169 |
| 5,566,285 A | 10/1996 | Okada |
| 5,572,439 A | 11/1996 | Nishida et al. |
| 5,583,973 A * | 12/1996 | DeLisi et al. ............... 345/420 |
| 5,621,867 A | 4/1997 | Murata et al. |
| 5,634,064 A | 5/1997 | Warnock et al. |
| 5,642,292 A | 6/1997 | Itai et al. |
| 5,661,518 A | 8/1997 | Palm et al. |
| 5,742,290 A | 4/1998 | Hayano et al. |
| 5,802,353 A | 9/1998 | Avila et al. |
| 5,835,693 A | 11/1998 | Lynch et al. |
| 5,883,628 A | 3/1999 | Mullaly et al. |
| 5,915,230 A | 6/1999 | Berne et al. |
| 5,960,118 A | 9/1999 | Briskin et al. |
| 5,980,096 A | 11/1999 | Thalhammer-Reyero |
| 5,986,662 A | 11/1999 | Argiro et al. |
| 5,988,862 A | 11/1999 | Kacyra et al. |
| 6,020,891 A | 2/2000 | Rekimoto |
| 6,023,277 A | 2/2000 | Osaka et al. |
| 6,026,215 A | 2/2000 | Fantone et al. |
| 6,084,594 A | 7/2000 | Goto |
| 6,094,196 A | 7/2000 | Berry et al. |
| 6,108,005 A | 8/2000 | Starks et al. |
| 6,125,332 A | 9/2000 | Nishina et al. |
| 6,141,034 A | 10/2000 | McCutchen |
| 6,157,747 A | 12/2000 | Szeliski et al. |
| 6,175,842 B1 | 1/2001 | Kirk et al. |
| 6,208,347 B1 | 3/2001 | Migdal et al. |
| 6,308,145 B1 | 10/2001 | Itai et al. |
| 6,313,836 B1 | 11/2001 | Russell, Jr. et al. |
| 6,326,983 B1 | 12/2001 | Venable et al. |
| 6,326,995 B1 | 12/2001 | Palm et al. |
| 6,400,366 B1 | 6/2002 | Davies et al. |
| 6,407,748 B1 | 6/2002 | Xavier |
| 6,430,546 B1 | 8/2002 | Stewart et al. |
| 6,466,239 B2 | 10/2002 | Ishikawa |
| 6,542,168 B2 | 4/2003 | Negishi et al. |
| 6,556,206 B1 | 4/2003 | Benson et al. |
| 6,582,233 B1 | 6/2003 | Clark |
| 6,628,279 B1 | 9/2003 | Schell et al. |
| 6,631,205 B1 | 10/2003 | Melen et al. |
| 6,636,210 B1 | 10/2003 | Cheng |
| 6,636,211 B2 | 10/2003 | Chartier et al. |
| 6,667,742 B2 | 12/2003 | Noettling |
| 6,683,607 B1 | 1/2004 | Matsuda et al. |
| 6,700,578 B2 | 3/2004 | Kamata et al. |
| 6,724,407 B1 | 4/2004 | Cheng |
| 6,727,100 B1 | 4/2004 | Vitt et al. |
| 6,727,924 B1 | 4/2004 | Anderson |
| 6,734,884 B1 | 5/2004 | Berry et al. |
| 6,745,204 B1 | 6/2004 | Hogue et al. |
| 6,758,677 B2 | 7/2004 | Clark |
| 6,793,497 B2 | 9/2004 | Herman et al. |
| 6,801,210 B2 | 10/2004 | Yomdin et al. |
| 6,822,662 B1 | 11/2004 | Cook et al. |
| 6,828,555 B2 | 12/2004 | Katayama et al. |
| 6,862,709 B2 | 3/2005 | Takiguchi et al. |
| 6,867,767 B2 | 3/2005 | Meldrum et al. |
| 6,894,690 B2 | 5/2005 | Capers |
| 6,937,257 B1 | 8/2005 | Dunlavey |
| 6,954,899 B1 | 10/2005 | Anderson |
| 6,970,790 B2 | 11/2005 | Kita et al. |
| 6,983,227 B1 * | 1/2006 | Thalhammer-Reyero ....... 703/2 |
| 6,987,512 B2 | 1/2006 | Robertson et al. |
| 7,003,737 B2 | 2/2006 | Chiu et al. |
| 7,020,837 B1 | 3/2006 | Kueny |
| 7,038,698 B1 | 5/2006 | Palm et al. |
| 7,047,171 B1 | 5/2006 | Sproch |
| 7,054,757 B2 | 5/2006 | Agrafiotis et al. |
| 7,055,092 B2 | 5/2006 | Yardumian et al. |
| 7,068,269 B2 | 6/2006 | Roberts et al. |
| 7,184,044 B2 * | 2/2007 | Chin et al. .................. 345/427 |
| 2002/0010819 A1 * | 1/2002 | Dye ........................... 710/68 |
| 2002/0015038 A1 * | 2/2002 | Patel et al. .................. 345/419 |
| 2002/0069217 A1 | 6/2002 | Chen et al. |
| 2002/0075257 A1 | 6/2002 | Chartier et al. |
| 2002/0118379 A1 | 8/2002 | Chakraborty et al. |
| 2002/0129905 A1 * | 9/2002 | Conant et al. ............... 707/511 |
| 2002/0143803 A1 | 10/2002 | Chen et al. |
| 2002/0158905 A1 | 10/2002 | Bazzoni et al. |
| 2002/0180809 A1 | 12/2002 | Light et al. |
| 2003/0128890 A1 | 7/2003 | Roesch et al. |
| 2003/0187587 A1 | 10/2003 | Swindells et al. |
| 2003/0194687 A1 | 10/2003 | Clark |
| 2003/0197737 A1 | 10/2003 | Kim |
| 2003/0218634 A1 | 11/2003 | Kuchinsky et al. |
| 2004/0032489 A1 | 2/2004 | Tyra |
| 2004/0046770 A1 | 3/2004 | Jones et al. |
| 2004/0069946 A1 | 4/2004 | Katayama et al. |
| 2004/0170949 A1 * | 9/2004 | O'Donoghue et al. ....... 434/278 |
| 2004/0217956 A1 | 11/2004 | Besl et al. |
| 2004/0233222 A1 | 11/2004 | Lee et al. |
| 2004/0239679 A1 | 12/2004 | Ito et al. |
| 2004/0257361 A1 | 12/2004 | Tabakman et al. |
| 2005/0119835 A1 | 6/2005 | Kita et al. |
| 2005/0119837 A1 | 6/2005 | Prakash et al. |
| 2005/0140668 A1 | 6/2005 | Hlavac et al. |
| 2005/0198561 A1 | 9/2005 | McAuley |
| 2006/0064247 A1 | 3/2006 | Yuan et al. |
| 2006/0069698 A1 | 3/2006 | Hintikka |
| 2006/0092156 A1 | 5/2006 | Trotta et al. |
| 2006/0109268 A1 | 5/2006 | Napoli et al. |

OTHER PUBLICATIONS

Hodis et al., eMovie: a storyboard-based tool for making molecular movies, Trends in Biochemical Sciences Journal, May 11, 2007, pp. 199-204, vol. 32 No. 5, Published by Elsevier, US.

* cited by examiner

| | |
|---|---|
|  | Genomes and DNA Sequences<br>• 3D DNA and RNA structural representations.<br>• Genomic sequence analysis and display. |
| 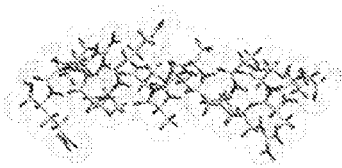 | Protein Structures<br>• 3D protein and graphical objects structures.<br>• Molecular surfaces.<br>• Labels and annotations<br>• Electrostatic and Crystallographic Displays |
|  | Sequence-to-Structure Environment<br>• Protein and DNA sequence alignments.<br>• Annotated alignments, trees and sequences.<br>• Sequences and alignments linked to the 3D graphical display. |
| 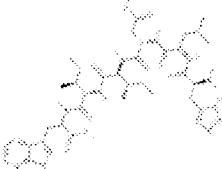 | Chemicals<br>• 2D chemical structures.<br>• Chemical views and chemical spreadsheet.<br>• 3D chemical representations.<br>• Chemical reactions and ADME representations. |
|  | Text-Linked to 3D View<br>• Integrated hyperlinked text to 3D display, alignments, chemical and data tables.<br>• Rich-text<br>• One or more text windows.<br>• Embedded pictures |
|  | Data Tables and Plots<br>• Tabular data linked to 3D display.<br>• Docking and virtual screening data.<br>• Experimental data such as ligand binding affinity.<br>• Histograms and Graphs<br>• Plots and tables linked to graphics e.g. ligand energy to pose |

FIG. 2

| | Representations |
|---|---|
| 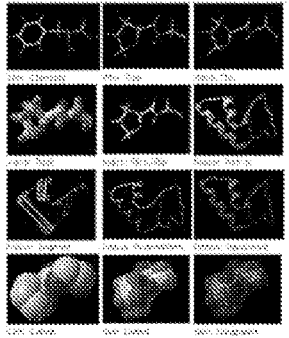 | Wire<br>Stick/Ball<br>Ribbon<br>Skin<br>CPK<br>Surface<br>Electrostatic<br>Color |
|  | Effects<br>Move<br>Rotate<br>Translate<br>Zoom<br>Rocking<br>Transitions<br>Transition Timings<br>Custom Animations<br>View Angles<br>Clipping Planes<br>Depth Cues |
| 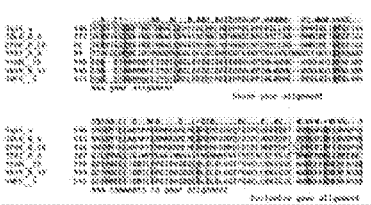 | Annotations<br>Atom and Residue Labels<br>Custom annotation<br>Boxing<br>Shading<br>Arrows |

FIG. 3

| | | | |
|---|---|---|---|
| 10 Animated Slides | 430 KB | 7/12/2005 2:27 PM | Molsoft ICM File |
| 10 Static Slides | 434 KB | 7/12/2005 2:26 PM | Molsoft ICM File |
| 1 Animated Slide | 201 KB | 7/12/2005 2:25 PM | Molsoft ICM File |
| 1 Static Slide | 201 KB | 7/12/2005 2:25 PM | Molsoft ICM File |

— Click and HOLD DOWN the Begin rocking/rotation button

Drag bar to change speed and range of animation

Click to add slide

Text which is linked to the graphical display is highlighted in blue. Click to activate display associated with the text.

More than one HTML document can be stored

Click on tab to change documents

The tab "Right Click" menu

| Features |
|---|
| Document File |
| Single file with a formatted document or presentation (currently within HTML specs, with internal images). |
| 3D panel: fully interactive 3D viewer for vector 3D object with rotation, translation, zoom. |
| Cross platform file |
| 3D panel: fully interactive 3D viewer for molecular objects |
| Compact file size |
| File Creation |
| One-click TRANSITION/ ANIMATION creation |
| One-click TRANSITION/ANIMATION speed/range control |
| One-click VIEW creation, VIEWPOINT, built-in IMAGE |
| More than one graphical object display |
| Content Browsing |
| Single cross platform browser program (no plugins). |
| Browser program includes an integrated panel for a formatted document with a specific layout |
| 3D panel: rotation, translation, zoom. |
| 3D panel: clipping, depth-cueing, lighting controls. |
| 3D panel: multiple VIEWPOINTS with a single click navigation between them |
| 3D panel: multiple VIEWS including graphical representations, and, colors |
| 3D panel: Annotations |
| 3D panels: view specific interactive and interruptible ANIMATIONS/TRANSITIONS |
| Animation on the fly (parametric), |
| File size does not depend on the duration of the animation. |
| Multiple Animations |
| Html-panel: formatted text with specific layout, inter-panel links, actions and images |
| Html-panel: multiple documents |
| Chemical table panel: |
| (S+) Multiple spreadsheet panels: |
| Plots and graphs |
| Sequence and or Alignment Panel (+M) |
| Connecting Panels |
| Linked Sequence and Structure |
| Linked Sequence-Structure-Alignments |
| HTML linked to 3D objects |
| Tables linked to 3D objects |
| Plots linked to 3D objects |
| User-defined panel layout |
| Miscellaneous Features |
| Adaptable for non-molecular 3D objects |
| Ability to use the file without online access |
| Dynamic links to protein databases |
| Dynamic links to sequence databases |
| Hardware stereo compatibility |

FIG. 21

Slide Thumbnail Sketch

STRUCTURED DOCUMENTS AND SYSTEMS, METHODS AND COMPUTER PROGRAMS FOR CREATING, PRODUCING AND DISPLAYING THREE DIMENSIONAL OBJECTS AND OTHER RELATED INFORMATION IN THOSE STRUCTURED DOCUMENTS

CROSS-REFERENCES TO OTHER RELATED PATENT APPLICATIONS

This application claims priority to U.S. Provisional Patent Application Ser. No. 60/700,043 filed Jul. 14, 2005 and U.S. Provisional Patent Application Ser. No. 60/807,475 filed Jul. 14, 2006 which are incorporated herein by reference in their entireties.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND

1. Field

The claimed subject matter relates to structured documents containing three dimensional and two dimensional objects along with their related information, and methods, systems and computer programs for authoring and viewing the structured documents.

2. Related Art

A number of different types of molecular modeling programs are known and used to produce and represent three dimensional molecular structures on at least one computing platform. This prior art typically makes use of one or more databases in order to organize the three dimensional information and in use, the one or more databases are accessed separately. The data from the one or more databases is then combined into a single screen output to the user, often creating problems with displaying diverse amounts of information.

The prior art includes various methods for disseminating and browsing annotated 3D molecular information. For instance, PDB file format viewers read PDB formatted files which are distributed by the Protein Data Bank (PDB.) The RasMol program, found on the internet at http://www.umass.edu/microbio/rasmol/ is one example of a PDB viewer. Other file formats such as CN3D, have their own viewers such as the CN3D viewer found on the internet at:

http://www.biosino.org/mirror/www.ncbi.nlm.nih.gov/Structure/cn3d/. Other general molecular viewing and graphics computer programs include Insight by Accelrys, Sybyl by Tripos, MOE by Chemical Computing Group and some previously published versions of the ICM-Browser by Molsoft including those versions below version 2.3.

Other non-molecular based viewers found in the prior art which allow a user to view or present data include the Powerpoint and Word programs by Microsoft and the Acrobat Program and Reader by Adobe Corporation. These viewers cannot read or display known molecular file formats and they are unable to display interactive molecular animations or transitions.

For instance, the Adobe Acrobat PDF file format used by the Adobe Acrobat reader displays one dimensional images of molecular representations which are typically displayed in the form of an embedded picture. Additional molecular graphics software is also required to generate these images. This is also the case for many internet web pages known in the art which require the use of more than one file which are located in directories of images and HTML documents.

Other viewers and browsers known in the prior art include internet (web) and Java based browsers and HTML-browser dependent plug-ins such as JMOL located on the internet at http://jmol.sourceforge.net/, and animation browsers such as the Kinemage files browser located on the internet at http://kinemage.biochem.duke.edu/ and MD trajectory viewers.

Further, these prior art viewers and prior art molecular file formats require a number of command triggers (such as mouse clicks and store commands) for a user of the viewer to accomplish basic tasks such as the creation of new files. For example, the applications Kinemage, JMOL and WebMol require a user to continually click and hold down a mouse button in order to rotate a molecule in the X, Y or Z directions or in order to view multiple images leading to an animated effect. Additionally, many of these viewers have predefined or default molecule rotations which are not able to be altered or manipulated.

Molecular animations include molecular or three dimensional transitions from one position in three dimensional space to another position. The above referenced prior art viewers employ various methods for molecular animations which are burdensome and which involve multiple steps which are required to be taken by the user.

Using these viewers, many individual animations are usually required to highlight a single idea and each animation needs to be pasted into the application. Once the animation is embedded in the viewer, it is fixed and changes are difficult to make without creating a new file. For example, in Microsoft PowerPoint it is necessary to create an animation using an additional piece of software. Once created, the animation is imported into the PowerPoint application. This is usually a time consuming process requiring knowledge of many different software applications and file types. The resulting animation file is generally large with additional files needed to be merged into a single file, and that file typically needs to be packaged and unpackaged in archive file format due to the large sizes of the embedded objects.

Prior art publications include U.S. Publication No. 2004/0170949 to O'Donoghue, et al. which describes a method and apparatus for depicting one or more biological elements in a basic environment by means of a data processing system comprising the steps of obtaining one or more data sets relating to a biological element, determining at least one first feature element from said data sets, said feature element providing information on a relation between said biological element and said basic environment, obtaining data determining a graphical representation for depicting at least one of the biological elements corresponding to said one or more data sets determining a relation between the graphical representation of said basic environment and said graphical representation on the basis of said first feature element, providing means for effecting that in a graphical representation of said environment generated from said data said graphical representation of said biological element is depicted as located on said display of said basic environment element according to said relation determined on the basis of said first feature element. This invention also provides for a method and apparatus for handling three-dimensional representations of biological molecules, such as proteins and protein complexes.

While prior art includes various methods and apparatuses for representing three dimensional objects, none are able to view those structures address using a single file, single-browser, platform independent method and viewer to view a document or a multi-slide presentation containing different animated and interactive molecular views in the environment of text, sequence, alignments and other data and without explicit representation of animation frames or coordinates.

SUMMARY

Embodiments of the claimed subject matter address these and other problems of the prior art by providing a single file, single-browser, platform independent, system, method and computer program in order to view a structured document file or any combination of views within that document, such as a multi-slide presentation containing different animated and interactive molecular views in the environment of text, sequence, alignments and other data and without explicit representation of animation frames or coordinates. One aspect of the claimed subject matter is a structured document file which includes graphical and non graphical information. The graphical information includes the vector and coordinate description of a representation of at least one three dimensional object and at least one of the following group of view attributes or features: rotation, translation, view angle, lighting, colors, specific graphical representations, labels and parameters. The vector and coordinate description are stored with or independently from the one or more view attributes or features and the vector and coordinate description and the one or more view attributes are stored in a single file which can be accessed and viewed by a structured document viewer. Related authoring tools and viewers are also disclosed.

Further aspects of the invention will become apparent from consideration of the drawings and the ensuing description of multiple embodiments of the claimed subject matter. A person skilled in the art will realize that many other embodiments of the claimed subject matter are possible and that the details of the embodiments can be modified in a number of respects, all without departing from the scope of the claimed subject matter. Thus, the following drawings and description are to be regarded as illustrative in nature and not restrictive.

BRIEF DESCRIPTION OF THE DRAWINGS

The above and other objects, advantages and features of the claimed subject matter will be more readily apparent from the following detailed description of the embodiments, when read in conjunction with the accompanying drawings wherein:

FIG. 2 is a table of molecular objects which may stored within IDMP file embodiments of the claimed subject matter;

FIG. 3 is a table of molecular representations, effects and annotations which may stored within IDMP file embodiments of the claimed subject matter;

FIG. 21 is a table of aspects of a IMDP system according to an embodiment of the claimed subject matter;

DETAILED DESCRIPTION OF THE EMBODIMENTS

Figure 1:
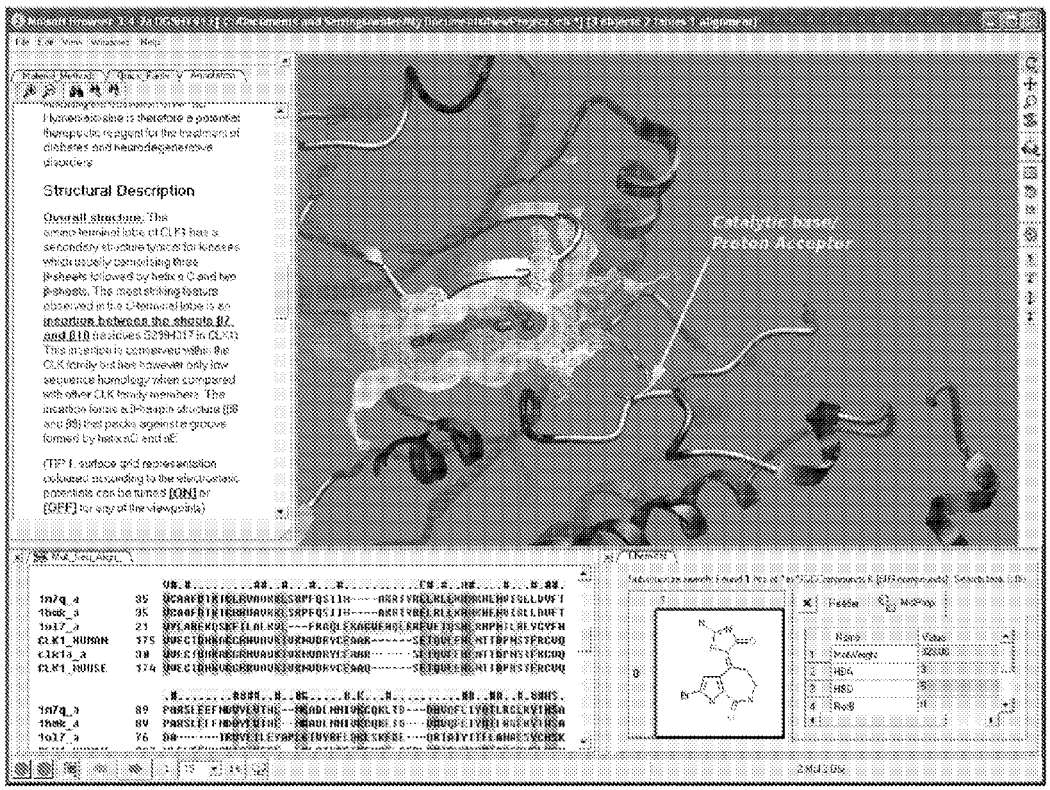
FIG. 1 illustrates a graphical user interface supporting the processing and viewing of a structured document for use in navigating and interacting with a structured document content according to an embodiment of the claimed subject matter.

The claimed subject matter is further described with reference to the accompanying drawings which show illustrations of exemplary embodiments. These embodiments are illustrated by way of example only, and as such, do not limit the claimed subject matter. The various elements and combinations of elements described below and illustrated in the drawings can be arranged and organized differently to result in constructions which are still within the spirit and scope of the claimed subject matter.

It should be understood that the phraseology and terminology used herein is for the purpose of description of the embodiments and should not be regarded as limiting. The use of "including," "comprising," or "having" and variations thereof herein is meant to encompass the items listed thereafter and equivalents thereof as well as additional items and/or elements. Embodiments of the claimed subject matter described herein provide for a single structured document file that can be produced, viewed, interacted with and distributed. Embodiments of the claimed subject matter are single platform independent structured documents which contain three dimensional graphic and non graphic information in the binaries and/or text located within the document. These documents with all graphics and other information may be viewed on a single viewer. the documents may also include one or more presentations.

It is also to be understood that the claimed subject matter may be implemented in various forms of hardware, software, firmware, special purpose processors, or a combination thereof. In one embodiment, the claimed subject matter is implemented in software as an application program tangibly embodied on a computational platform such as a program storage device. A computational platform is defined as any digital computer system which includes a digital processor; memory which includes memory storage locations accessible by said digital processor, a visual output device to generate a visual output derived, at least in part, from said digital processor, and an input device to generate an input that can be acted upon by said digital processor.

Embodiments used as an application program may be uploaded to, and executed by, a machine having any suitable architecture. For instance, a machine may be implemented on a computing platform having hardware such as one or more central processing units (CPU), a random access memory (RAM), and one or more input/output (I/O) interfaces. The computer platform also includes an operating system and micro instruction code for operation of the platform. The various processes, structured document files and functions described herein may either be part of the micro instruction code or part of the application program (or a combination thereof) which is executed via the operating system. In addition, various other peripheral devices may be connected to the computer platform such as an additional data storage device, a projector device, and/or one or more printing devices.

It is to be further understood that, because some of the components and method steps depicted in the accompanying figures may be implemented in software applications, the one or more connections between the system components or the process steps may differ depending upon the manner in which the claimed subject matter is implemented. It should be apparent to one of ordinary skill in the related art that there are a large number of similar implementations or configurations of the described embodiments.

One of the biggest challenges in biology, chemistry and bioinformatics is the transfer and communication of ideas and data between these scientific disciplines. For example, the best way for a chemist to understand how to improve the potency of a drug compound is to look in detail at the ligand binding site of a molecular structure solved by a crystallography laboratory. Therefore the crystallographer requires a way of easily transferring the three dimensional data as well as related information to the chemist.

In another scenario, a computational chemist or bioinformatician may want to present a new potential, "drug-like" compound for a biologist to test in the laboratory. A good way to convey this information is to show the compound graphically along with any other related information. This combination of graphical display information with other related information such as hyperlinks and text can also be useful in educational settings, such as in the classroom, at scientific conferences, and in scientific print media.

Embodiments of the claimed subject matter facilitate the transfer of this combined information in a single file which can be transferred easily from computer to computer and from computing platform to computing platform without the file or structured document needing to be externally altered, such as with the use of a compression technique. The user does not need to have any special skill or programming knowledge as the embodiments of the structured document allow the transparent creation and viewing of the structured document files.

Embodiments of the structured document are referred to as files, such as the IMDP file. These embodiments provide novel means for users to interface and interact with one or more three dimensional (3D) objects as well as related two dimensional (2D) information in a single viewer or browser interface so that the user can explore and navigate the structure of the object or objects while at the same time interacting with the one or more object's associated information. In the IMDP file embodiments which will be described further, the three dimensional objects are one or more biological molecules and the related two dimensional information shown includes the one or more molecules' associated sequence information.

In the described embodiments illustrating biological molecules, users can produce and exchange interactive three-dimensional (3D) and two-dimensional (2D) information consisting of multiple interactive views and animations of molecular structures and graphical objects in conjunction with related hyperlinked text, chemical, biological sequence and other data views. Such methods, systems and computer platforms are referred to as Interactive Molecular Document(s) and/or Presentation(s) or IMDP. Similarly, embodiments of the Interactive Molecular Document(s) and/or Presentation(s) Method and System are abbreviated as IMDPMS embodiments (IMDPMS).

The embodiments of the structured documents, document viewers and authoring tools are used to create, view and interact with the graphical and non graphical information. Embodiments of the IMDP viewers are computer enabled applications or programs which can access, display and interact with an IMDP file which contains all the necessary data, multiple views and layouts, animations and transitions so that a molecular representation and related textual information can be read directly into that single viewer.

The three dimensional object stored and rendered in the embodiments may be a static object or it may be a dynamic object. The three dimensional object may also consist of a presentation of multiple objects. The three dimensional information may also incorporate functionality as well as structure into the rendered object.

FIGS. 1 through 24C illustrate various aspects of embodiments which employ the structured document methods, systems and computer enabled programs according to the claimed subject matter. More specifically, FIG. 1 illustrates a graphical user interface of an embodiment of a structured document viewer, the IDMP browser. It shows an example of a typical rendering of the content found in an IMDP file. This browser interface allows the structured document IMDP file to be read and interacted with by the user.

The available information includes a broad range of molecular information including interactive 3D and 2D information consisting of multiple interactive views and animations of molecular structures and graphical objects and related hyperlinked text, chemical, biological sequence and data views. The standalone IMDP browser in this embodiment reads the information from a platform independent IMDP file. In this example, a CDC-like kinase 1 (CLK1) structure solved by SGC Oxford is shown and the ATP-binding site is represented as a surface wire-frame colored by electrostatic potential. The ligand is also shown in a stick representation and the catalytically important residue in the active site is indicated with a label and arrow. A fogging algorithm is also used to convey a sense of depth by altering the appearance of the displayed information.

On the left hand side of the display, a text window contains the materials and methods, essential biological and functional information along with expert interpretation and annotations of the structure. At the bottom of the screen is a multiple sequence alignment of the closest deposited structures in terms of sequence. Specific residues in this alignment can be highlighted and displayed interactively on the structure. To the right of the sequence alignment, the ligand is shown in the standard 2D representation with its predicted chemico-physical properties. The toolbar at the far right-hand side provides access to different interactive modes and atom selections.

Figure 4:
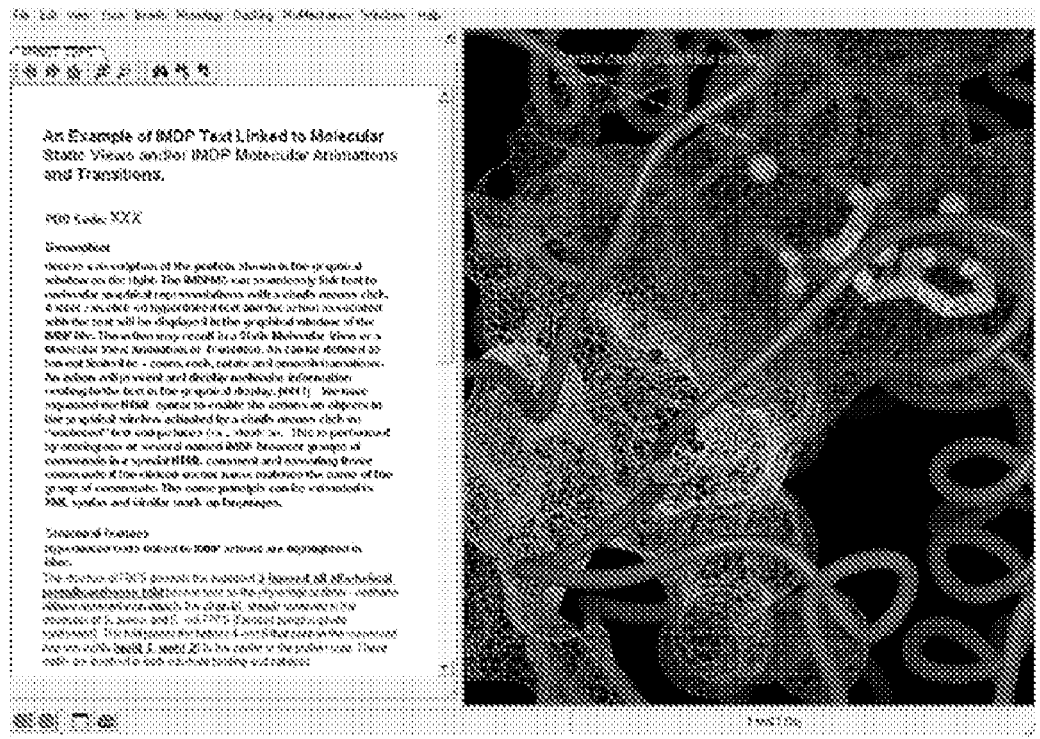
FIG. 4 is an illustration of a graphical user interface using hyperlinks according to an embodiment of the claimed subject matter.

FIG. 2 is a table of molecular objects which may stored within various embodiments of the IDMP file structured documents and FIG. 3 is a table which shows exemplary molecular representations, effects and annotations which may stored within various IDMP file embodiments. FIG. 4 is an illustration of an IDMP presentation or document main front screen. The interactive hyperlinked text is shown on the left. The molecular graphical display window is on the right.

Figure 5:
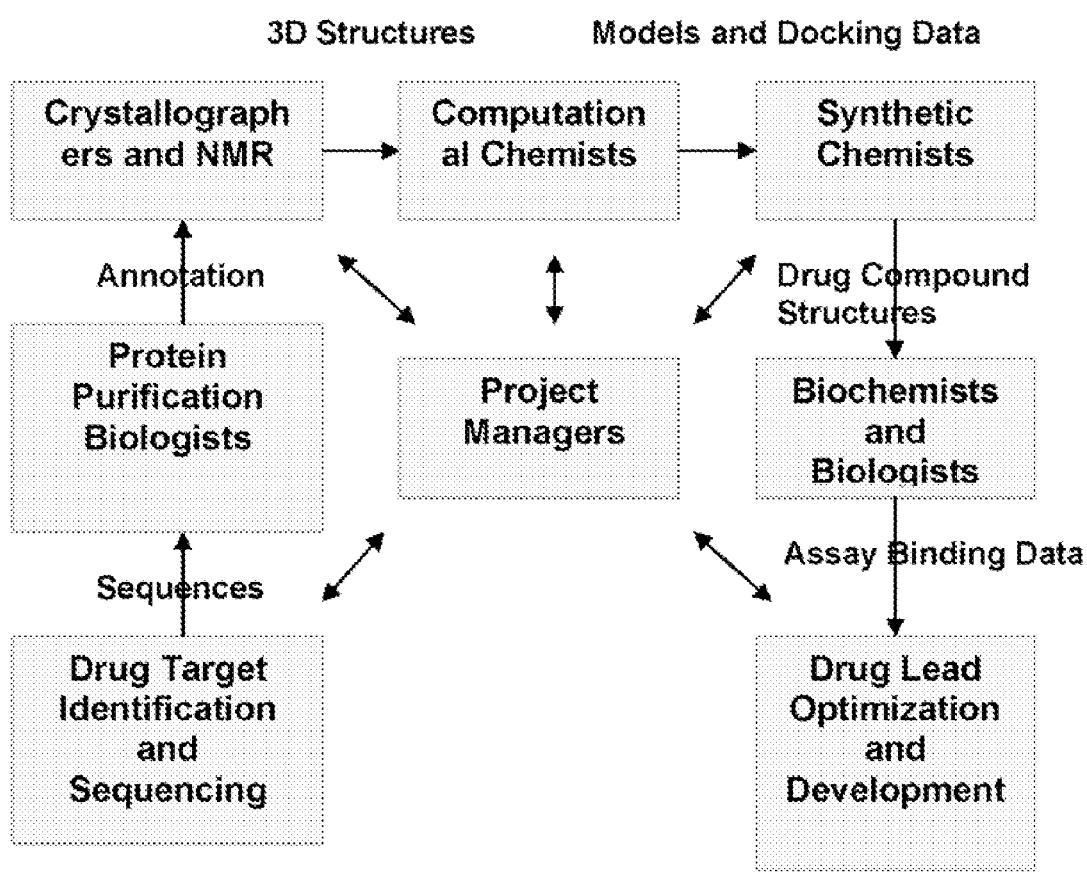
FIG. 5 is a chart showing possible uses of embodiments of the IMDP file for the exchange and presentation of molecular information during the drug discovery process.

FIG. 5 illustates simplified scheme to demonstrate the need for a unified file (IMDP) for the exchange and presentation of molecular information during the drug discovery process.

Embodiments of the structure document or file of the claimed subject matter may be used in a variety of scenarios and settings including but not limited to:

(1) localized and in detail browsing of one or more PDB formatted files by an individual or a group of individuals seated around a single personal computer;

(2) sharing of molecular information discovered in a wet-laboratory;

(3) sharing molecular information discovered by a computational chemist or bioinformatician;

(4) presenting three dimensional graphics and related textual data to a scientific audience by way of graphical slides and animations, rather than using multi object, multi file applications such as Microsoft PowerPoint;

(5) presenting published results from crystallographic and structural biology groups over the internet;

(6) teaching the principles of molecular structure and function to a wide range of audiences from middle school to university level; and, (7) using a structured format file to present structural information described in published papers and journals, for example structural biology journals and crystallographic journals, rather than using an Acrobat Reader by Adobe Corporation to open and view a portable document file (PDF) or any other type of printed format.

Figure 6:
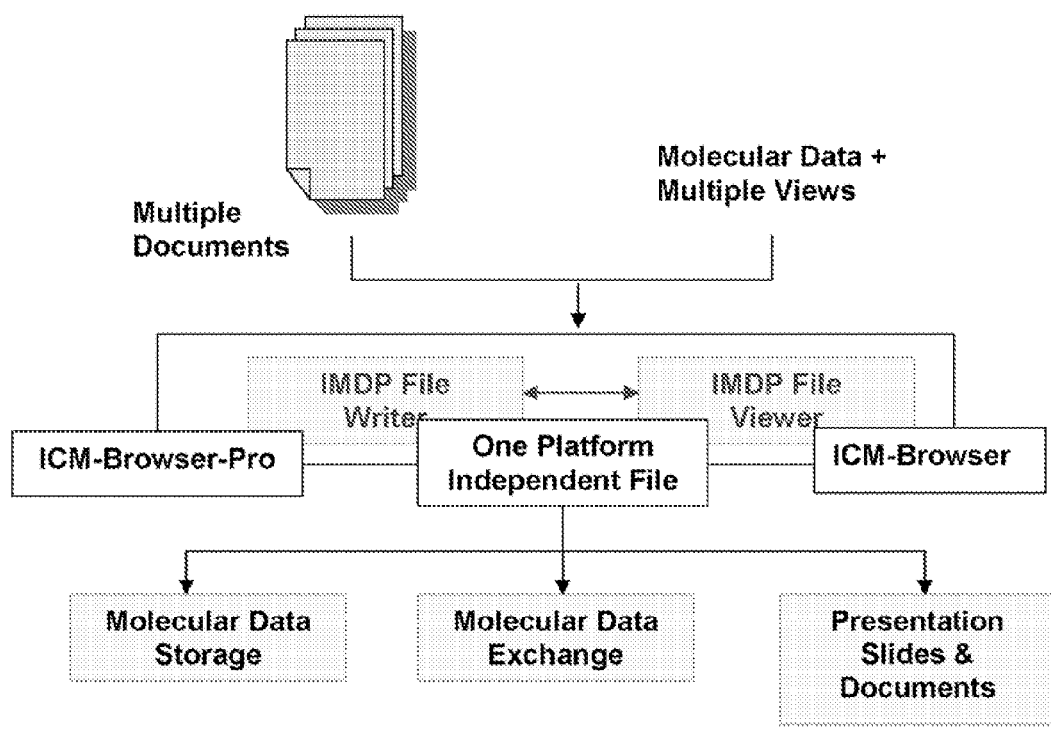
FIG. 6 is a chart illustrating components of an IMDP environment according to an embodiment of the claimed subject matter.

Embodiments of the claimed subject matter can help with any of these scenarios because they may be used as standalone applications to view files and because the embodiments use file sizes which are typically smaller than others known in the art and thus they can be transported, opened and read with greater ease than those previously known in the art. Further, the smaller file size requires less computing requirements than those of larger sized files. Additionally, new animations can be generated and included within a file using a single click of the mouse instead of using one or more cutting and pasting actions. FIG. 6 is a chart illustrating the various components of an IMDP environment according to embodiments of the claimed subject matter.

The IMDP file embodiments may be comprised of a single binary or text file which can contain molecular data in both static form (also referred to as a "static molecular view") and in animation form (also referred to as "molecular view animation" or a "transition.")

As previously mentioned, the single IMDP file embodiment contains all the needed information such as multiple views and layouts, animations and transitions so that a molecular representation and related textual information can be viewed by a user directly within a single IMDP browser.

The size of embodiment of the IMDP file are smaller than those of other comparable viewers. The IMDP file is compressed in such a way that slides with static images are of a similar size. This compact size allows a large amount of information to be stored in the single file without needing to be a file archive built or compressed with an external archiving application.

Figures 7, 8:
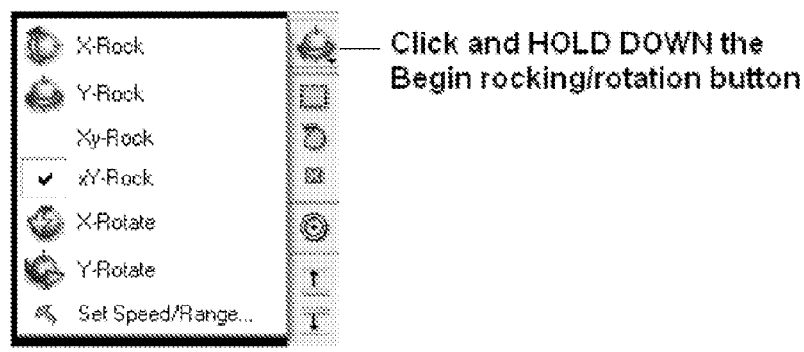
FIG. 7 illustrates a listing of various IMDP structured document file sizes according to embodiments of the claimed subject matter.
FIG. 8 illustrates an aspect of an IMDP writer embodiment of the claimed subject matter.

FIG. 7 illustrates four exemplary file sizes, with the first entry representing a single file with a size of 430 KB, the file containing ten animated or dynamic slides. The next entry represents a file with a size of 434 KB and ten static slides. The third entry on the listing represents a single file with a size of 201 KB containing a single animated slide, showing a typical size of a file containing an exemplary animation of a hemoglobin molecule. The last entry represents a single file with a size of 201 KB containing a single static slide. This files shows a file typical in size of a file containing a static slide of a hemoglobin molecule. The number of slides and pages of text contained within an IMDP file, which may include one or more IMDP-Documents or IMDP-Presentations) is limited only by the memory of the computer on which the IMDPMS is running. In an embodiment illustrated in FIG. 7, the IMDP-File includes the file name and an identifier extension *.icb (e.g. FILENAME.icb).

Since embodiments of the structured document IMDP file can be compact, they can also be quickly and easily transferred between users and other computing platforms. In the described embodiments, the IMDP file is not compressed or archived, although other embodiments of the structured document files may be archived, such as with a tar or a zip applications for compressed storage. All files can be stored locally on a single machine, and no transfer of other information between clients is required.

The embodiments of the structured document file may be downloaded from a web page or an internet storage site, or they may be sent or received via e-mail, via any other file transfer protocol, or any other method known in the art. The IMDP file may also be stored locally or it may be distributed remotely, such as via the internet where it can be stored so that multiple users can access and share object data associated with the file.

Embodiments of the IMDP file may also be computing platform independent, that is they may be read by an IMDP compatible viewer or browser on a number of different computer platforms with the same or different Endian representations of binary data. Compatible computing platforms include the Mac OS, Windows, Linux, Unix, Silicon Graphics Irix platforms, or any other suitable computing platform.

Other embodiments can be designed to be compatible with only a single computing platform. This may be desirable in situations having proprietary databases wherein vendors desire to protect their propriety information using secure viewers or browsers. Embodiments of the IMDP-File may also be stored in a database format such as MySQL, Oracle, or any other suitable database format. In this form, the text contained within one or more slides or other document components can then be searched using standard database searching protocols.

The IMDP file may contain at least one of the following groups of features and elements: (1) atomic level: 3D molecular structures, 2D chemical structures, chemical views and chemical spreadsheet; (2) residue/nucleotide level: biological sequences, sequence alignments; (3) gene or protein level: genome or proteome view; (4) 3D graphical objects; (5) one or several rich-text windows; (6) data tables; (7) molecular surfaces; (8) ligand-binding pockets; (9) protein residue labels; (10) atom labels (11) user defined annotations; (12) variable labels (13) hydrogen bonding patterns; (14) structural tethers; (15) structural distance restraints; and (16) HTML text. These embodiments may also be used for displaying molecular objects contained in other formats, for example those objects contained in PDB files.

Embodiments also include at least one view. A view (also referred to as a component view or a molecular view in the case of molecules) is an interactive graphical representation of one or more three dimensional objects. A view defines the appearance of the entire visible area in the viewing panel, and a view does not depend on what was viewed before except in the case of transitions. Thus, views are not predefined images or sets of coordinates or vector representations of three dimensional objects. Furthermore, the views and objects rendered in those views may changed interactively by the user after they are first invoked allowing the user to further change and optimize the views.

The view components of an IMDP file embodiment may include a variety of three dimensional object information as well as any other related non graphical information. For example, an IMDP file can contain multiple views including but not limited to information about specific views, viewpoints, colors, representations, view angles, zoom, clipping planes, view depth or depth cues, fog, animations, transparency, texture, transitions to highlight different features of a molecular structure or object, and transition timings.

In one embodiment of a Static Molecular View is an interactive graphical representation of single or multiple 3D molecules defined by atom connectivity and coordinates. The molecular view defines the character (e.g. wire-frame, ball and stick, space-filling solid) and color of the representation of each atom and bond. In addition other molecular features can be represented by a simplified surface or ribbon representation of the chemical backbone. A molecular view also includes a preferred user-defined viewpoint. The Molecular View Point defines the following: the relative position of the observer and the coordinate frame of the 3D object, the zoom level and the location of the front and back view clipping planes. In other embodiments, the three dimensional molecular view of the molecule may be represented by: CPK, surface, ribbon or worm representations of the chemical backbone.

Further, structural representation of molecules contained within an IMDP-File can be colored according to atom type, residue, chain, b-factor, object, occupancy, hydrophobicity, accessibility, polarity, secondary structure and/or alignment.

A viewpoint may be defined by the author of the during or after creation or it can be defined by the user when the user saves the viewpoint. The viewpoint includes the relative position of the observer and the coordinate frame of the three dimensional object, the zoom level and the location of the front and back view clipping planes.

Additionally, views may contain transitions and movements which include but are not limited to: movement of the object in a smooth transition from one point to another, rocking and rotating. Animations incorporated into a molecular slide for a document or presentation make the communication of scientific data clearer. For example, if a structure is rotating then more details and information can be gleaned than from a static molecular object. Most of these processes may be implemented with a single action by the user, such as a single click of the mouse or these functions may be automatically generated based on the stored view presentation information that is stored within the file itself.

Embodiments of the structured document files can be used as presentations and those presentations may include multiple renderings referred to as slides which are one or more predefined smooth transitions that can themselves incorporated into the one or more views contained in the file. These embodiments may also include one or more default animation effects as well as one or more user-defined animation effects. An IDMP presentation is an example of an embodiment containing one or more three dimensional molecular slides and related non graphical information. These embodiments may contain a series of slides of molecular static views, animations or transitions along with non-graphical information such as textual information that relates to those view, animations or transitions.

In other embodiments, the IDMP file has predetermined limitations which allow the user to interact with the document or presentation in any of the aforementioned manners but which are restricted to one or more parameters set by the author of the file. An authoring tool more fully discussed below allows the author of the structured document file to restrict all users except or including the author from initiating or maintaining any of the previously mentioned functions. These limitations include not allowing a user to initiate one or more functions or not allowing a user to go beyond one or more preset limitations such as limiting rotation to 180 degrees in one plane. Other embodiments can include write protection, version control, and editing and modification rights which are known to those skilled in the art.

An IMDP-Document is text linked to a series of molecular static views, animations, or transitions. If the user clicks on any of the hyperlinks, the viewer communicates with a link manager component of the viewer and that component may then executes the link destination so that the user is directed to that hyperlinked destination, which can be in one or more of the views or can be the only view. After the hyper linking has been completed, further information can be viewed either in graphical or non graphical form. For example, when used within a structured document viewer environment, a user may jump to a particular point of the text or a particular detailed image of the three dimensional object being rendered, and the associated hyperlink associated with that text or image can be clicked by the user so that the viewer can jump in that viewing window to the linked item.

Another embodiment includes a method to implement a hyperlink management system that can incrementally update link rules. The link manager software that uses the link database to keep track of link rule changes by using time stamps does this. Incremental hyperlinking is done either by changing existing link specifications or by adding some extra link specifications. When adding new link specifications, the hyperlinker executes the new link specification on all documents, adds new links without destroying the old ones. When a link becomes obsolete, based on the Id of the old link, the old links are removed. A similar procedure is adopted when adding new links.

Embodiments of the structured documents including the IMDP files have animations and transitions that use compact elements and parametric definition in contrast to the individual frame storage techniques found in the prior art. One embodiment uses parametric features with interactivity as defined as the ability to change representations, colors and viewpoints of the one or more static molecular views and/or transition and animations, and performance in real time on the computing platform is typically independent of the computing platform processor speed. Other embodiments may also include compactly stored view-specific animations and transitions.

The methods and systems can be used by but not limited to, schools, academic laboratories, university educators and companies to communicate and/or teach molecular information and ideas.

Embodiments of this structured document file contain the required molecular information for the user to browse and/or interact with molecular objects and structures. For example, in one embodiment the user may interact with the document or presentation by performing one or more functions including but not limited to—Zoom, Rotate X, Rotate Y, Rotate Z, Cut Plane, Move Rear Clipping Plane, Move Front Clipping Plane, Center and cuing effects.

Figure 9A:
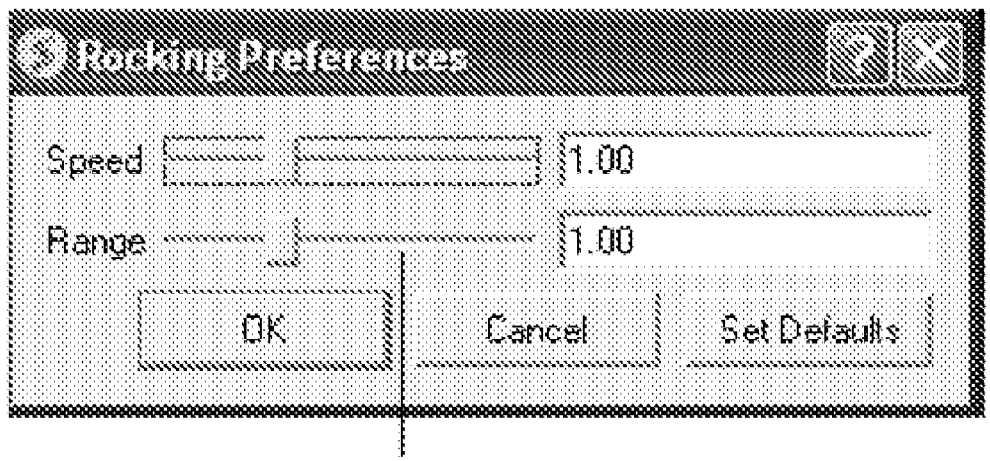
FIG. 9A illustrates another aspect of an IMDP writer embodiment of the claimed subject matter.
Figure 9B:
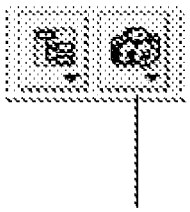
FIG. 9B illustrates yet another aspect of an IMDP writer embodiment of the claimed subject matter.

As stated, these animations and transitions are stored so that every intermediate frame of the animation or transaction does not need to be stored in the file. This feature aids in maintaining the small size of the structured document files. Storage of multiple views, layouts, and "parametric movements" independently of the 3D objects is used to create and browse compact, interactive and animated 3D presentations in which views (or slides) are changed with one click. FIG. 8 illustrates one such user interface where a user can click and hold down the rocking or rotation button. FIG. 9A shows another interface allowing a user to change the speed and range of the animation and FIG. 9B shows an interface allowing a user to add a slide.

Figure 19:
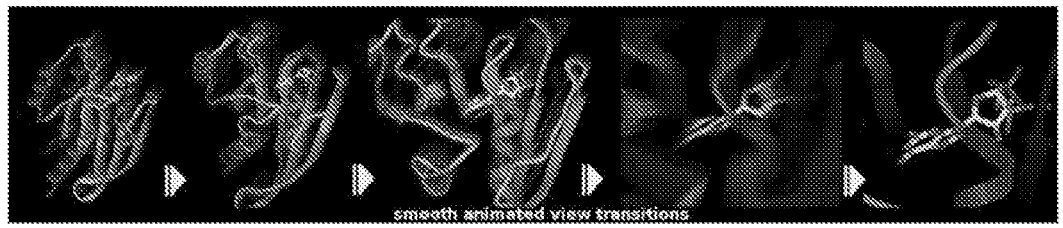
FIG. 19 illustrates a transition effect of an IMDP viewer according to an embodiment of the claimed subject matter.

A molecular animation or transition, as illustrated in FIG. 19, is a gradual change of a viewpoint, an appearance and disappearance of representations, and the internal molecular geometry or relative positions of three dimensional objects. This animation or transition may be initiated by the user or pre-initiated by the author of the file, but then continues remaining to be interactive. Embodiments generate a smooth animation or transition, store only the needed types and the parameters of those Molecular View Animations and Transitions, and allow a user to render animations on the fly with an IMDP browser.

The embodiments diminish the size of the IMDP files while retaining the smoothness and quality of the animations and/or transitions by avoiding the need to store a complete set or series of pre-recorded Static Molecular Views.

Features of the animations include parametric definition. Any view can be defined by a "World view" (or the observer location with the respect to the 3D scene), the coordinates (Cartesian or internal), and the numerical attributes of representations, such as color, alpha-channel, size, type. Any of these parameters can be interpolated and the view rendered dynamically on the fly with the IMDP browser to ensure a smooth transition. For example, applying a rotation to the "World View" results with a smooth rotation in front of an observer, or interpolating internal coordinates, such as torsion angles in a molecule will result in a smooth rotation around rotatable bonds, or applying an interpolation to an alpha-channel of a ribbon will result in appearance or disappearance of a ribbon. A set of movements in 3D space can be defined with the parameters including the starting point, the ending point and the absolute time of transition (e.g., in milliseconds). The method presented here stores just the parameters of the movements and transitions and uses a catalogue of interpolation formula and absolute time to calculate the transient current set of parameters. For example, to make a smooth transition between two views with different rotation, translation and zoom, a transition matrix is decomposed into rotation and translation; the rotation axis is determined and the rotation angle is interpolated linearly around this rotation axis. To interpolate between two sets of internal coordinates, a linear interpolation can be applied corrected by the 360 degrees periodicity. The interpolation may also require multiple reference points. The above representation of transitions and animations dramatically reduces the size of the IMDP for both documents and presentations.

The molecular animations or transitions are fully interactive responding to a keyboard or mouse signal which are captured and processed after each iteration. Such a signal may lead to a command changing any of the above properties of one or more views.

Embodiments also can include a Kinemage or a "kinetic image," known in the art as an interactive three dimensional illustration. Because kinemages contain simple geometric objects, points, lines, spheres, and the like, they are suited to a great variety of subjects, from simple sketches to sophisticated plots to detailed schematics of 3D objects. They can be used in the present embodiments to show selected three dimensional object information to a user with one or more of their own "views" that are selected by the author to highlight one or more significant features. A user can click on one of the named views and the kinemage will "jump" to that view. You can then rotate it, zoom in or out, etc. to explore further. You can always return to the original view by selecting it again from the menu. Kinemages without any predefined views still get an automatic "overview" view. This can be a useful way to return to a known starting point if you get lost in a complicated structure.

If the file has more than one Kinemage, the user can choose which to view from the drop box on the right, just above the buttons. Kinemages often include animations. An animation in this sense is not a movie, but more like a flip-book, where similar images are aligned and displayed one at a time, in a series of discrete frames. If a Kinemage contains animation (s), there will be forward and reverse buttons for the animation located below the checkboxes for groups and masters.

Embodiments using IMDP files with parametric animations include molecular animations or transitions that are assigned their default motion including but not limited to rotation, rocking, and transitions without generating explicit coordinate sets.

These parametric animations can be user defined or created on the fly with a single trigger action such as a mouse click or other input trigger. This allows the user to construct new parametric animations with a single click of the mouse. Embodiments of the structured documents contains fully interruptible animations and/or transitions and once interrupted they remain fully interactive without any loss of information or delay in performance. In the IMDP file, the Molecular Animation and Transitions can be interrupted with a single click of the mouse button allowing a user to interrupt and/or change animation views without any loss of performance. Once interrupted, the Molecular Animation and Transition is paused and the current view can be changed to the viewer's preference.

For example, when using IDMP during a presentation to an audience and a question is asked about a specific residue in a protein the Molecular Animation or Transition can be interrupted with a single mouse click and the presenter can quickly and easily zoom onto the molecular object in question. Also, for example, the cutting of molecular planes could be used to slice through a protein to better understand the surface of a drug binding pocket during a presentation. These interruptions can be undertaken immediately with a single click of the mouse, and they are performed with little to no noticeable loss in the performance of the computing platform. In this embodiment, the Molecular Transition and/or Animation can be stopped permanently or simply paused and can then be released again to continue its trajectory.

Objects and molecules contained within an IDMP File can also rotate, rock, or be highlighted by zooming onto them without the user having to continually touch the mouse. Molecular transitions from one position to another which are referred to as molecular animations are also easily produced using the IMDP one-click mouse technology. These molecular transitions may be stored within the IMDP file embodiments. The speed and range of the rotation, rocking or transitions is user defined. A one click button is used to change the speed and range is all that is required to modify the format of these transitions. Views and transitions can also be stored in the IDMP file with respect to the current views without any additional functions being performed by the user.

For example, a series of views along with the assigned "parametric" animation information can be stored in a IMDP presentation in which the transition between the views is smooth and which is invoked with a single keystroke or mouse trigger event (i.e. wherein the user uses a cursor keys or a mouse button on the computing platform input interface to trigger the storage of the currently displayed information into the IMDP file.) Embodiments of the IMDP files with animations and transitions are processor speed independent and therefore may be rendered and viewed similarly on various computing platforms.

In many embodiments, the speed of the viewing and interacting in the graphical user interface is timeframe independent to the speed of the machine. Since the same set of operations between the frames can take different time on different computers, and furthermore, may fluctuate on the same computer depending on transient load and memory access the absolute time independent rendition may not work properly in some embodiments.

In order to ensure similar flow of the animations and transition with the frames which are rendered according to the interpolations described above we used the following method: A. the frames are not interpolated at equal parameter intervals (e.g. rotation_angle=iteration*rotationIncrement). Instead, the absolute time is measured at each interpolation step, and the time difference with the previous rendition is measured. Then the step in the parameter space is determined and adjusted according to this particular time increment. This method eliminates uneven flow depending on the load fluctuations, as well as platform dependence. In some embodiments, the smoothness of IMDP Animations and Transitions can break down and become noticeable if the commands needed to be executed between sequential interpolations take longer than a fraction of a second.

Molecular Views and Animations can be activated by one-click hyperlinks contained within the text window of the IMDP-Presentation or the IMDP Document as illustrated in FIG. (see old FIG. 3). The hyperlink command can perform a number of functions including but not limited to Zoom, Rotate X, Rotate Y, Rotate Z, Cut Plan, Move Rear Clipping Plane, Move Front Clipping Plane, and Center.

While a single IMDP file contains all the necessary data, multiple views and layouts, animations and transitions for the representation of molecular or chemical elements, other embodiments of structured documents according to the claimed subject matter include similar elements which represent graphical representations of tangible goods (such as items sold via e-commerce transactions,) real estate (such as a three dimensional image of a commercial building, medical imaging views, equipment or procedures, intangible goods. military applications, services, or any other suitable product, process or service that can be represented graphically in multi dimensions along with other information. Other related information may include any other three dimensional graphics, two dimensional graphics and any other non graphical information.

The structured document viewer allows three dimensional images and related non graphical information to be displayed on the screen while at the same time seamlessly linking the graphical and non graphical information. In an embodiment for viewing an IMDP file, an IMDP browser allows users to view and interact with view components that are related to each other so that all view components relate to the object data found in the single IDMP file.

Figure 24A:
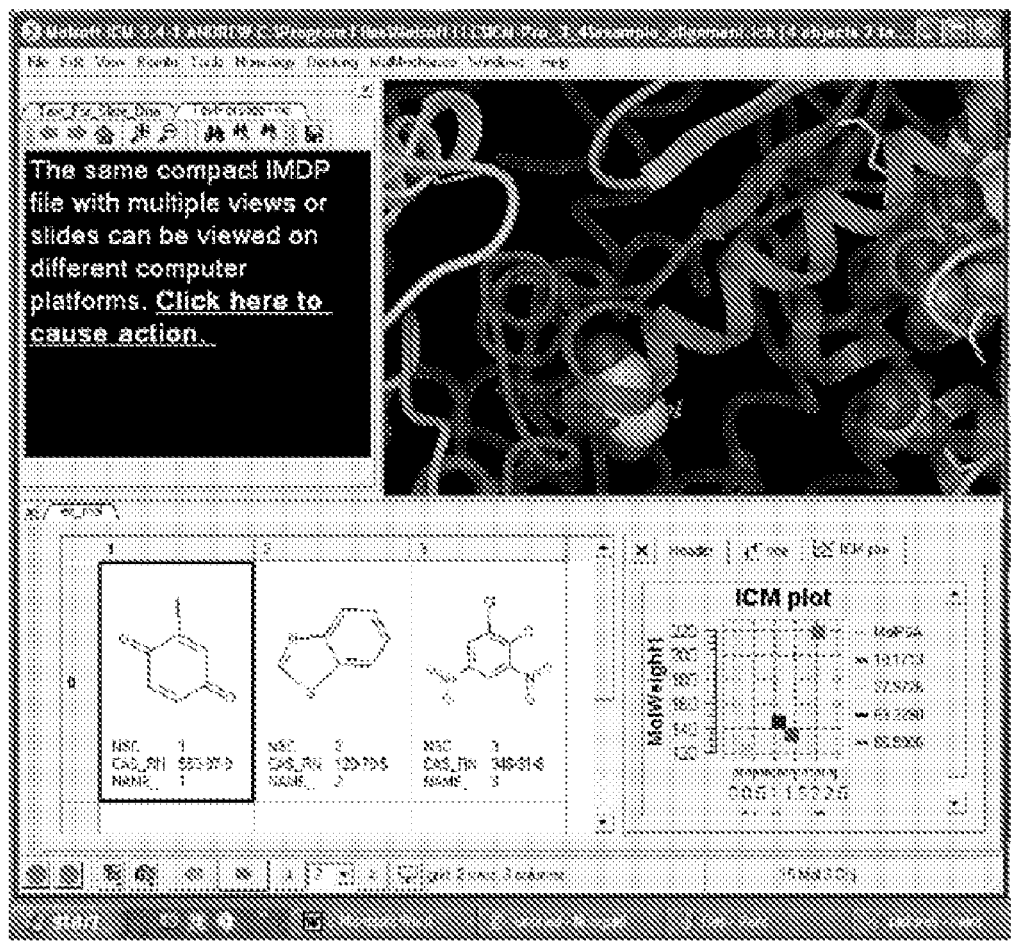
FIG. 24A illustrates a graphical display interface used on a Microsoft Windows computing platform according to an embodiment of the claimed subject matter.
Figure 24B:
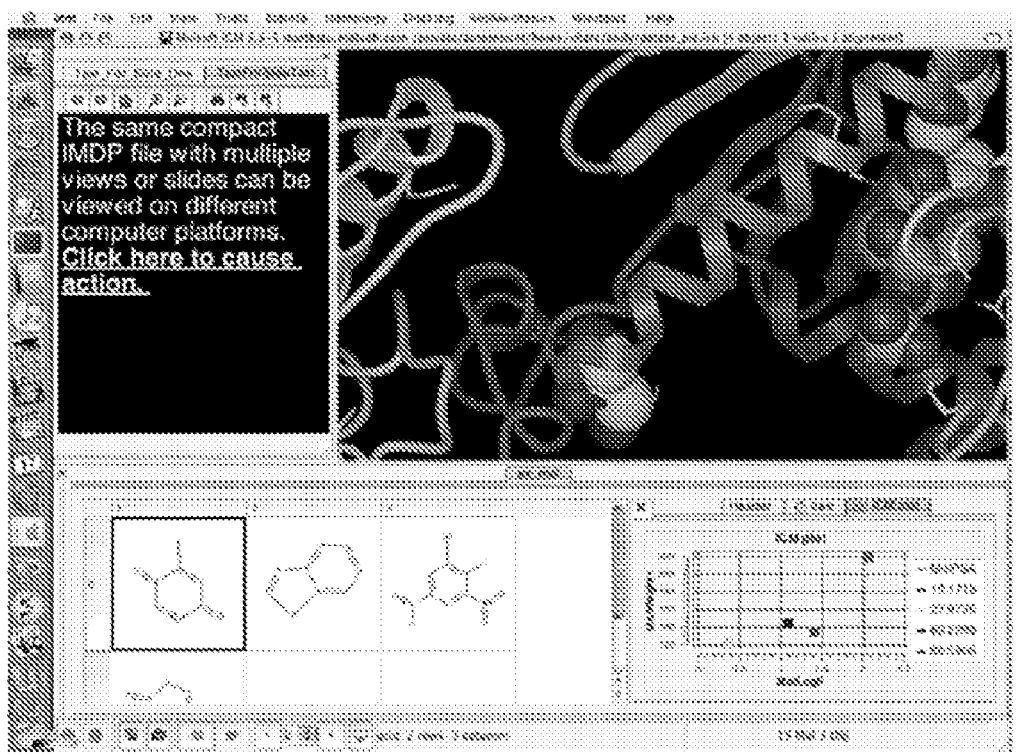
FIG. 24B illustrates a graphical display interface used on a Apple Macintosh computing platform according to an embodiment of the claimed subject matter.
Figure 24C:
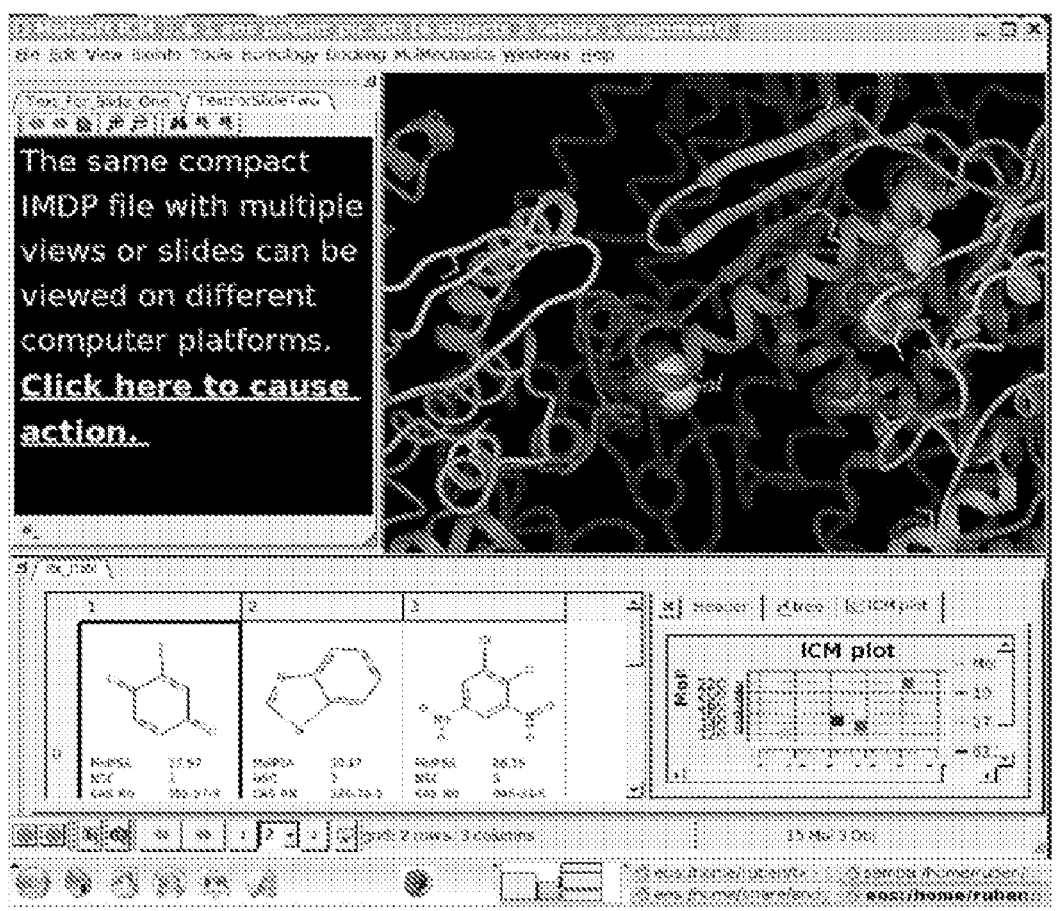
FIG. 24C illustrates a graphical display interface used on a Linux computing platform according to an embodiment of the claimed subject matter.

The IMDP browser is a single application and a single executable file that does not require any extra plug-in and executables. External tools can also be used for browsing the help information or following external html links, secondary to the main content of the document or presentation. The IMDP-Browser in some embodiments is platform independent. In these embodiments, the file containing one or more IMDP documents and presentations can be viewed on different platforms include but are not limited to Macintosh, Microsoft Windows, Silicon Graphics, and Unix/Linux systems. FIGS. 24A, B and C illustrate graphical user interfaces on three different platforms.

Molecular graphics and bioinformatics file formats can be stored within and IMDP-File and displayed in a presentation or document within the IMDP-Browser. The file formats that IMDPMS can recognize include but are not limited to PDB, HTML, MOL, MOL2, FASTA, ICM, CSV, 3D MESH OBJ, and SEQ.

In an IMDP file embodiment, each of the various data types contained within the IMDP-File can be visualized interactively using the IMDP-Browser. 3D molecular objects can be rotated, zoomed in and out, and depth cuing effects altered. Sequence alignments can be displayed and manipulated. Data tables containing molecular structures and/or numerical and text data can be displayed and manipulated. Molecular moves can be generated displaying rotation and rocking at various positions, speeds and ranges. Once a Molecular Animation or Transition has been generated, all actions can be undertaken without additional manipulation by the user with the mouse, keyboard or dials. FIG. 21 shows a table showing a feature set of embodiments.

The IMDP-File can be browsed interactively with the IMDP-Browser without the need to download plug-ins or other applications. The application requires the user to have IMDP-Browser downloaded on the machine on which the user wishes to view IMDP documents and presentations. However IMDP does not require any other additional pre-downloaded external software when viewing IMDP presentations and documents.

Other viewer embodiments may modify other types of viewers such as html browers or an Adobe Acrobat® Reader™ using a plug in module so that the browsers may act as a viewer. This plug in may include additional software so that when a structured document file is selected by a user, the viewer may check for an updated version of the structured document plug in, and if available, download it for use with the structure document file being loaded.

Embodiments of the structured document viewers such as the IMDP-Browser have a continual live connection between hyperlinked text and the molecular views contained within the structured files being viewed. In other embodiments, the live connection may be maintained periodically rather than continuously. In yet other embodiments, the connection between hyperlinked text and the molecular views contained within the structured files is not required.

According to these embodiments, the user can at any point alter rotation including Z-axis rotation, rocking, initiate or maintain translation, zoom, clipping, visual effects, view alternative graphical representations of the same object, switching view animations and transitions on and off for a Molecular View at any time including the time during Animation or Transition. These functions can be manipulated by the user to improve the clarity of a particular point of interest in a molecular object or structure contained within an IMDP-File. The user can use mouse, keyboard or other control devices to interact with the browser.

Figure 13:
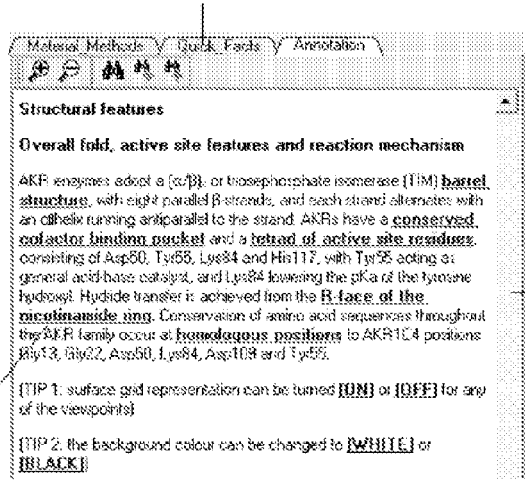
FIG. 13 illustrates a tab function, a scroll function, and a hyperlink of the IMDP viewer according to an embodiment of the claimed subject matter.

An IMDP-Document is another embodiment of an IMPD file text that is linked to a series of molecular static views, animations, or transitions. In an embodiment where an IMDP file is being used in document mode then the user will generally read the text on the left hand-side of the display as shown in FIG. 4. If the user requires a detailed molecular view pertaining to the text within the IMDP document then the user would click on the hyperlinked text as illustrated in FIG. 13 and a corresponding view would then be displayed on the right hand side in the viewer. This view can either be Static Molecular View or a Molecular View Animation or a Transition. The user may sit and study the currently displayed view. Another view or animation can be displayed simply by clicking on different hyperlinked text in the text window. The Static Molecular View or Molecular View Animation or Transition can be manipulated by the user by rotating, zooming, or clipping. Alternatively, the molecular object can be altered, so it moves between transition points using a rocking or rotating motion depending on which movement has been pre-defined in the construction of the document. A user may decide that more detail is required, so the display can be interrupted by the user without any loss of molecular information. This format can be used as a single document that can be downloaded and shared throughout the scientific community.

Figure 14:
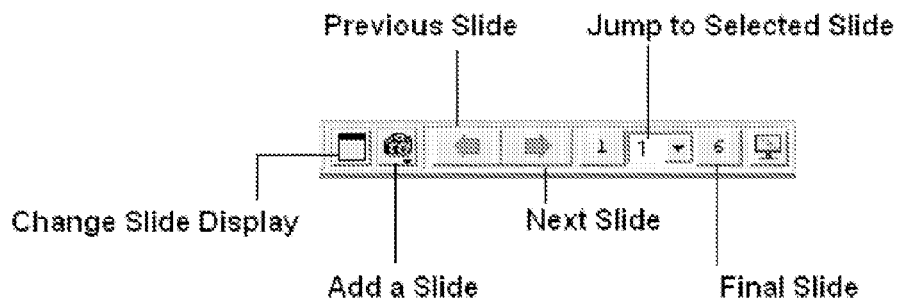
FIG. 14 illustrates a navigation aspect of the IMDP according to an embodiment of the claimed subject matter.
Figure 15:
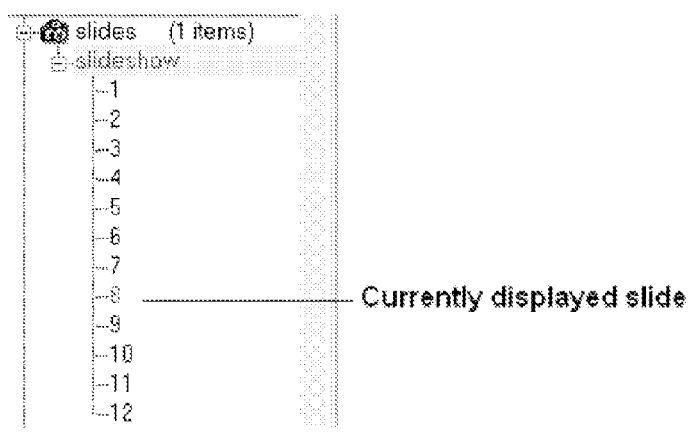
FIG. 15 illustrates an aspect of an IMDP presentation according to an embodiment of the claimed subject matter.
Figure 16:
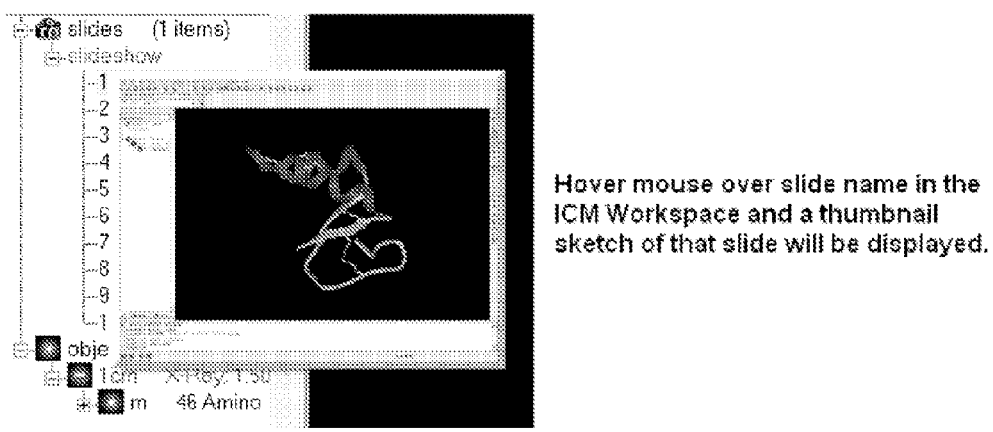
FIG. 16 illustrates another aspect of an IMDP viewer embodiment of the claimed subject matter.

In another embodiment wherein the viewer is being used in presentation mode, the user can display text in conjunction with one or more predefined slides comprised of one or more views. The user can click on the text to display a molecular slide or, in the case of the presentation mode, use the interactive slide buttons as shown in FIG. 15 to move from one slide or molecular view to the next, as shown in FIG. 14. The views can either be Static Molecular Views or Molecular View Animations or Transitions and can be manipulated in the same way as IMDP documents. FIG. 16 also illustrates a feature allowing a user to hover over a slide number of FIG. 15 in order to view a popup window containing a preview of the slide.

In a presentation embodiment, a group member of the viewing audience could request more information regarding a particular molecular object. The Molecular Animator Transition could then be interrupted so that the user/presenter can then zoom into a particular region of the object under consideration for closer scrutiny or further exploration.

Embodiments of the claimed subject matter include an authoring tool for creating and modifying structured document files in accordance with the claimed subject matter. In several embodiments, the IDMP writer is used to create IDMP files. These IDMP files containing IMDP-Documents or IMDP-Presentations may be created or modified by the IDMP writer. The IMDP-Writer is a method of creating individual Views with all the attributes including but not limited to the windows layout, graphical representations, viewpoint exactly as seen at that time and with a single mouse click. The user can create animation and transition effects exactly as seen by the user on the graphical user interface with a single click or keyboard action that triggers the creation or modification of the IMDP file.

Figure 11:
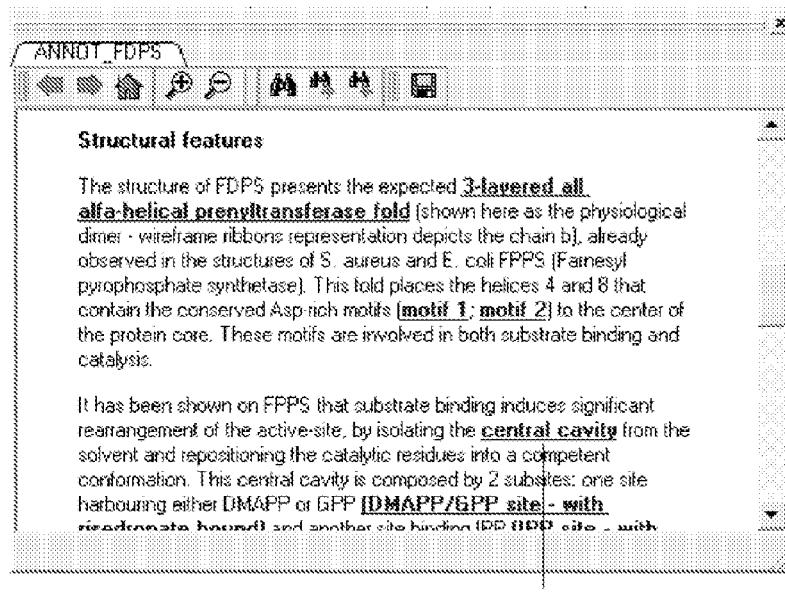
FIG. 11 illustrates an example of the text display within an IMDP file according to an embodiment of the claimed subject matter.
Figure 12:
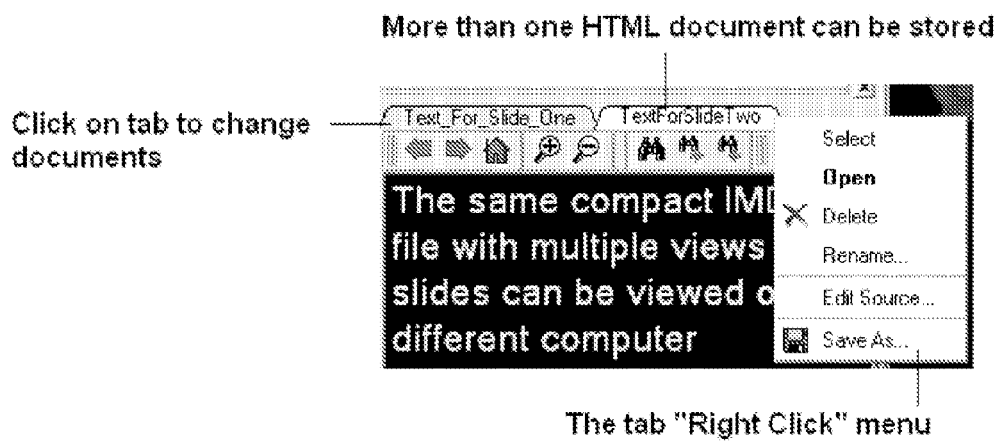
FIG. 12 illustrates an aspect of an embodiment of the claimed subject matter that allows a user to create more than one HTML document in an IMDP file embodiment of the claimed subject matter.

In an embodiment of the authoring tool used to create a structured document such as an IMDP document, a user would type some amount of relevant text into an editor provided in the viewer, in this case the IMDP-Browser. The user would next add HTML tags such as headers and links by highlighting the appropriate text and clicking with the mouse on a specified button which triggers the production of the desired HTML tag by the editor. This process is repeated until the user has save as many pages of text and hyperlinked text as desired. Next, molecular animations or transitions are associated with the hyperlinked text, and the resulting IMDP structured document file is saved to memory or a computer readable medium such as a hard disk with a file name and a ".icb" extension file tag. Different color and sizes of fonts can be stored in the text window. A number of different header styles can also be defined. FIG. 11 illustrates an example of the text display within an IMDP file and FIG. 12 shows how a user may store any number of HTML documents within the file.

To enable interactivity, various methods and functions can be integrated into the file structure using methods known to those skilled in the art. In one example, the HTML syntax can be expanded to enable the actions on objects in the graphical window to be activated by a single mouse click on "anchored" text and pictures (<a . . . >text</a>). This is performed by storing one or several named IMDP-Browser groups of commands in a special HTML comment and executing those commands if the clicked anchor name matches the name of the group of commands. The same principle can be extended to XML syntax and similar mark-up languages. The implementation involves writing a pre-processor which (1) parses the HTML source and identifies all the commented section with a specific tag e.g. "IMDPBrowserscript"; (2) stores all names groups of commands in memory; (3) captures the signal indicating that the particular anchor is clicked during run time the IMDP-Browser; and (4) executes the IMDP commands if that name matches the pre-stored action name in the IMDP-Browser. If the name doesn't match, a default HTML action is performed in a standard fashion.

Figure 20:
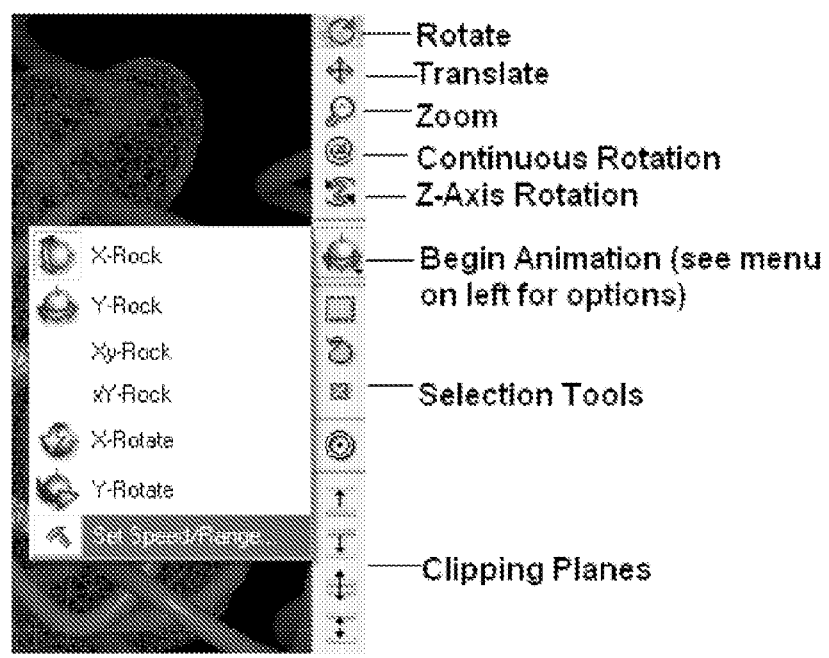
FIG. 20 illustrates several user selectable functions of a IMDP viewer according to an embodiment of the claimed subject matter.

Molecular Animations and Transitions are constructed by using the buttons shown in FIG. 20. Transitions from one point in molecular space to another can be created as well as rocking and rotating movements. Other actions include Zoom, Rotate X, Rotate Y, Rotate Z, Cut Plane, Move Rear Clipping Plane, Move Front Clipping Plane, Center and cuing effects. The user would set the structure in the position required using the mouse in the graphical user interface then click the appropriate buttons as shown in FIG. 20. These one-click transition buttons activate the creation and storing to the file of Molecular Animations or Transitions in IDMP files.

Figure 22:
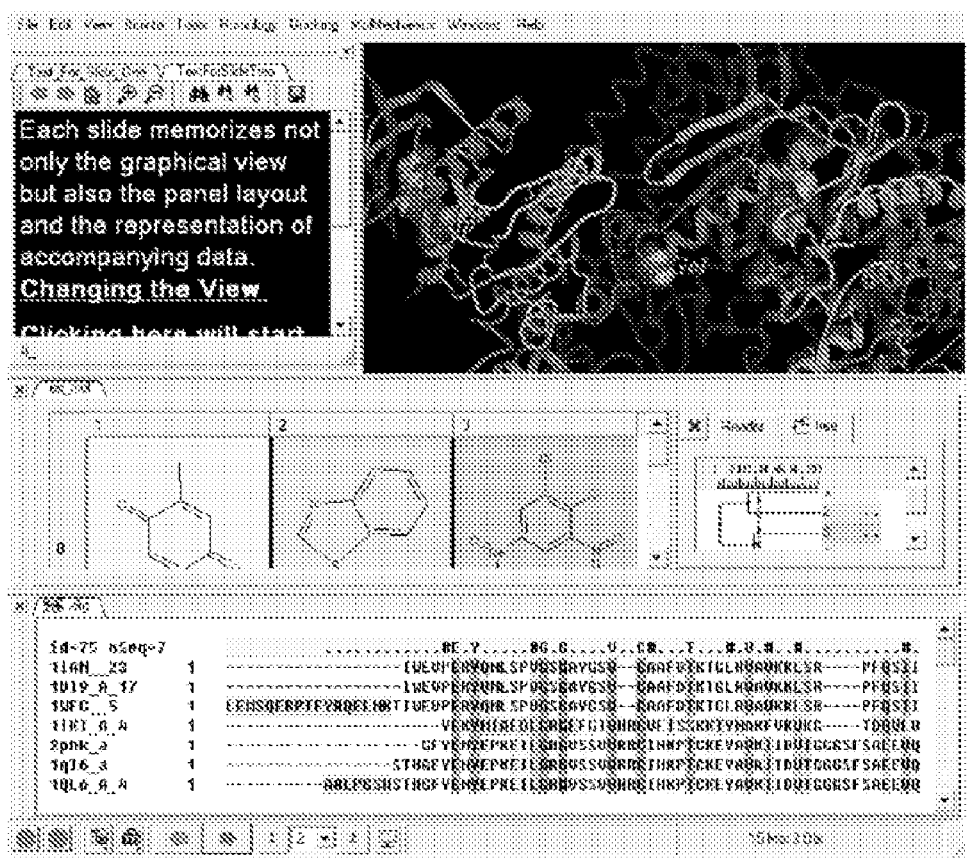
FIG. 22 illustrates aspects of the graphical user interface of an IMDP viewer according to an embodiment of the claimed subject matter.

FIG. 22 illustrates an IDMP document or slide showing graphical display, alignments, chemicals and plots all in a single display. Each display can be turned on and off by clicking a button or by displaying a different slide.

Figure 23:
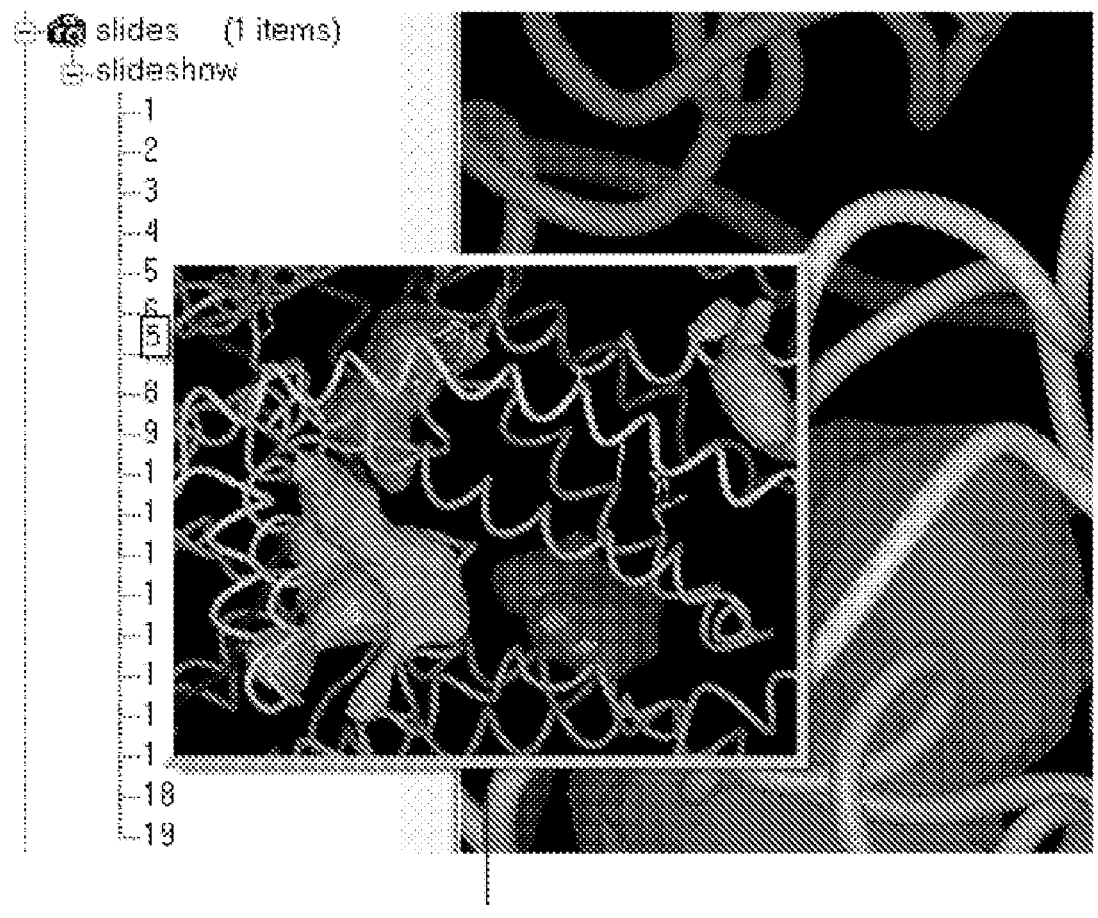
FIG. 23 illustrates aspects of a IMDP presentation according to an embodiment of the claimed subject matter.

FIG. 23 illustrates thumbnail sketches of slides stored within an IMDP document or presentation. The thumbnail is shown as a square panel. The thumbnail sketches aid navigation through the document or presentation.

Figure 17:
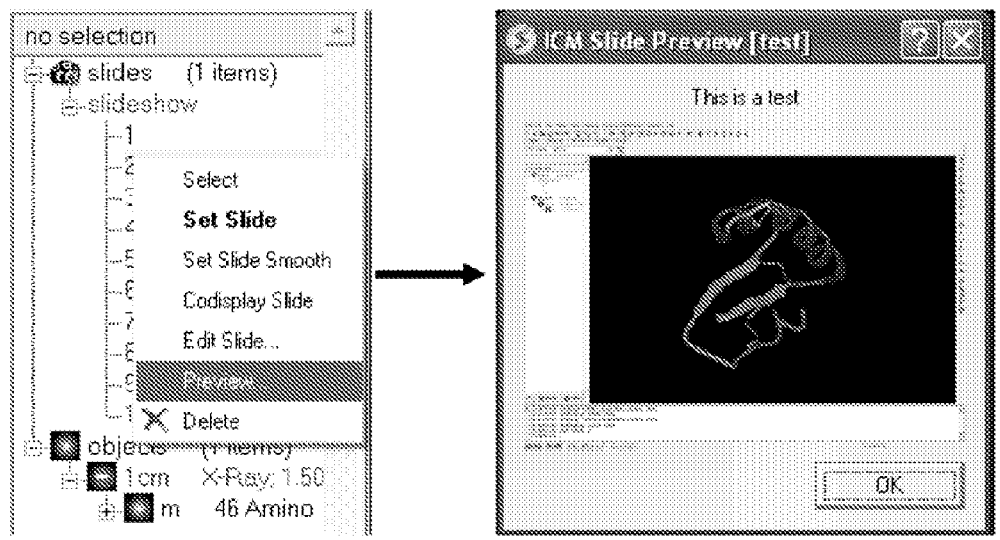
FIG. 17 illustrates a preview aspect of an IMDP viewer embodiment of the claimed subject matter.
Figure 18:
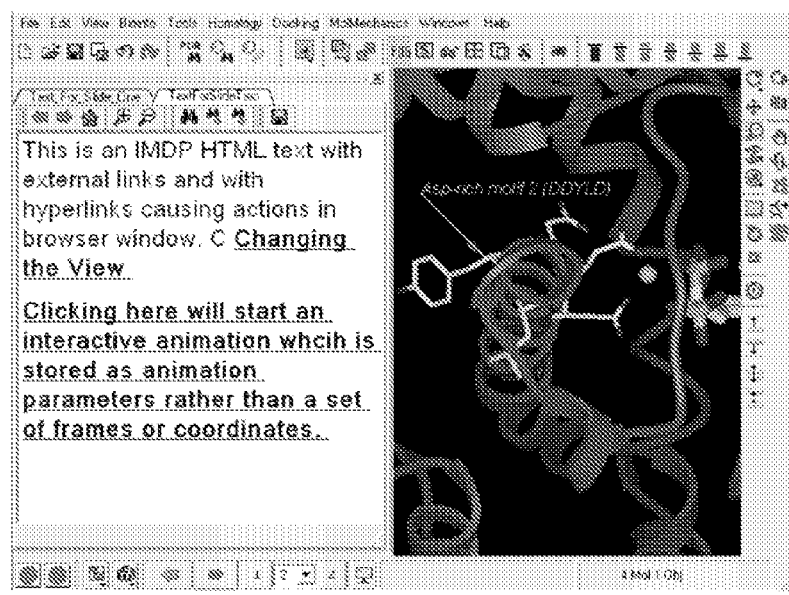
FIG. 18 illustrates an aspects of an IMDP viewer embodiment of the claimed subject matter.

Slides can be constructed by embodiments of the authoring tool such as the IDMP writer by first setting the desired action as described in the previous paragraph followed by clicking a camera button shown in FIG. 17. FIG. 18 shows the resulting interactive animation on a graphical user interface. The user will repeat these steps until the slide presentation is complete. The number of slides constructed is displayed in a panel at the bottom of the IMDP window (FIG. 17.)

As previously stated, slides can be browsed forward and back by clicking on the arrow buttons shown in FIG. 15 or the user can jump to a specified slide number by clicking on a drop down arrow.

In one embodiment, the steps involved in creating a IMDP file using an IMDP writer include: opening the IMDP-Writer software on the client machine, and reading into the IMDP Writer at least one molecular object such as a protein DNA sequence, an alignment, or a protein/DNA/chemical structures. In this embodiment, direct links to databases of these objects are provided in the IMDP-Writer software. the next step is reading into IMDP-Writer text, tables or plots related to the molecular data, then defining he first molecular view, selecting a molecular representation, and selecting an initial view point using the graphic control buttons such as rotation, translation and zoom. Views can then be assigned user-defined transitions and animations. Animations and transitions include rocking and rotation (A) and the speed and range of these can be adjusted (B) as illustrated in FIGS. 8 and 9A. Once the initial view is prepared it can be saved as a slide by pressing the button as shown in FIG. 9B. The slide can then be stored where it can be accessed again by double clicking on the slide name in the Workspace Panel. The Workspace Panel is a repository for all objects and slides stored in the IMDP-Writer.

Figure 10:
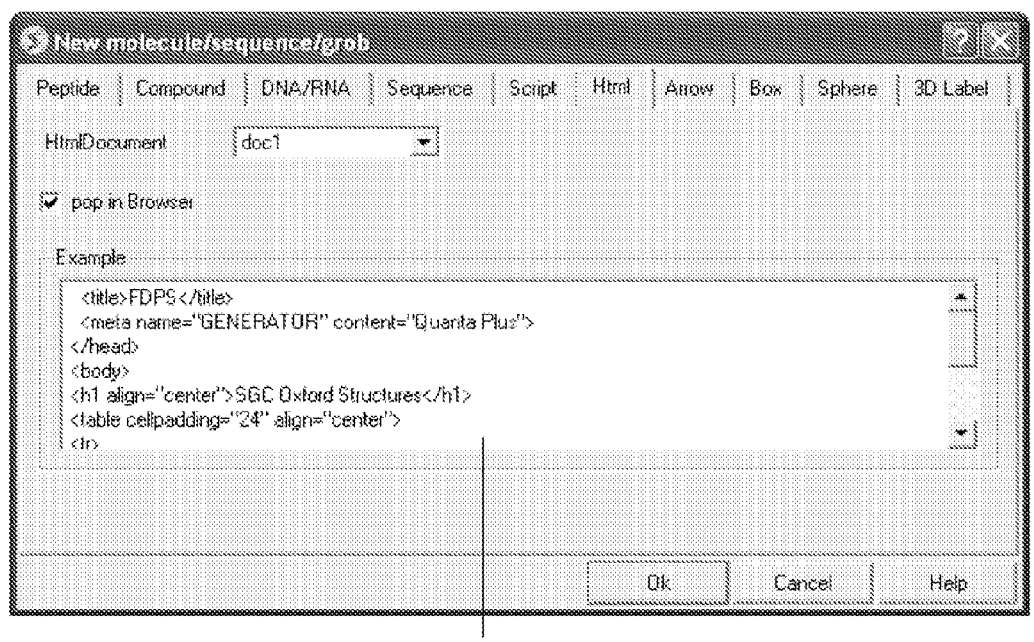
FIG. 10 illustrates an aspect of adding a hyperlink between the text and the graphical object using an IMDP writer according to an embodiment of the claimed subject matter.

In another embodiment, hyperlinked text may be added to the views in the IMDP file as shown in FIG. 10. The text in entered standard HTML format with any associated standard HTML commands such as header size and background color. This text may be changed at a later time. The hyperlink is then created between the text and the graphical object by adding an anchor to the html code using the "Edit Source" option in the interface menu. Previously stored slides may be text links using similar methods.

Other embodiments include methods to generate and store multiple views and layouts for 3D objects. For example, in each of the 3D objects (e.g. 3D-graphical objects defined by sets of vertices, lines or triangles or molecules defined by connectivity and 3D coordinates of each atom) the authoring tool can separate the data-fields from the representation characteristics (e.g. color, transparency, labels and annotation, type of graphical representation). A binary pattern of displayed and un-displayed representations for each data element (e.g. vertex surface element or atom) are then generated. The list of properties can include but is not limited to a view angles, clipping planes, depth cues, fog, animations, transparency, texture, transitions and transition timings.

All of the above view descriptions may be stored separately in the computer memory and consequently in the IDMP file without an overhead of repeated data fields (e.g. coordinate names and types). Therefore storing multiple views becomes possible without large memory and space penalty. Internal compression may also be further used to reduce the size. Each view data-chunk for each 3D object remembers the name and the key characteristics of the 3D object, otherwise known as a signature, to be able to recognize it upon matching. Therefore, to assign a view to an object a developer needs to compare the signatures between a view and a object and if it matches then the view descriptions from each view-chunk are sequentially transferred to the object elements.

Other views, viewpoints, images and action links in the formatted text associated with the embodiments may be inserted and enabled with one or more APIs which are a set of routines that an application uses to request and carry out lower-level services performed by a computer's operating system. They also include a set of calling conventions in programming that define how a service is invoked through the application. In one embodiment, the IDMP browser uses an api to execute a particular action. A GUI interface framework which supports events such as drag n drop, mouse and keyboard actions and has standard GUI items such as buttons, menus, and edit fields may also be used. A formatted text editor is also used whereby formatted text is stored in HTML-style (any text format, rtf or xml) format. The formatted text is then edited by developing underlying description which describes the format of the text. Actions by the 3DDoc user or creator are then captured. Actions could include drag and drop of views, viewpoints or images into the formatted text editor or an explicitly requested action. We have a text source which contains special tags which specify viewpoint, view or image. The developer needs to implement a parser which recognizes specific html-style tags for slides in the GUI framework, these tags need to execute the appropriate call in the 3DDoc-browser. For example to create a link invoking a particular view a link will be inserted as shown below:

```
<!--icmscript name="3"
display slide=slideshow index=1
--><a name="3" href="#_"><img src="3.png" title="click here"/></a>
```

This example contains special tags which allows the interpreter to perform an internal call and invoke a command (for this example display slide and the associated number of slide). Regarding layout, the authoring tool enables the file to store relative positions of different windows contained within the file (for example windows may include text, table, 3D graphics.) The relative sizes of different layouts and also their visibility and floating state are taken into consideration and the ratio of each size is recorded. This enables the IDMP file to have the same layout regardless of the size of the screen it is being viewed on.

The files used for producing single cross platform files can be saved in both text and in binary format, with binary a smaller file size. In order to make the binary form of the file cross-platform we would save the data to a binary file with the same endian. For example Intel has both endian. Different platforms have different ways of storing integers or real numbers—therefore different order of bytes—our files have the same order of bytes—therefore on platforms where it does not match—they are swapped. They are written with the same endian (we have arbitrarily chosen big endian for these files but small endian would work in the same way) on all platforms. When it is written text and lists are always written with the length of the string or list of objects and we have a fixed length for describing the size of the object. For example, if the writing program is the wrong endian the bytes are swapped upon writing and similiarly if a binary file is read to the program with the wrong endian the bytes read from the file are swapped.

The structure of embodiments of the IMDP file consist of blocks which have a preceding field of 4 or 8 bytes which defines the length of the block, each block contains version information, and a file header which has a list of the objects contained in the file and their types. Other embodiments of the claimed subject matter include open file formats for the IMDP Molecular Data File which enable interoperability and user-customization. In one example, an open-format XML development standard is used for an Extensible Markup Language (XML) Molecular format for the IMDP multi-component files. This open source format of file can extend the availability of three dimensional graphical and non graphical information. The molecular XML format enables users to view and understand the contents of the IMDP file and develop customizable viewers, properties and functions. The molecular XML formatted file may also contain another three dimensional object and related two dimensional information. These formats can incorporating sequence, structure, representations, chemicals, transitions and animations and the capability to interlink all these entities.

A structured document of the claimed subject matter such as the IMDP file can contain many permutations of molecular data and representations, animations and transitions. Although one click technology currently exists to prepare the contents of an IMDP file, the preparation of a complex file in other embodiments requires knowledge of scripting and HTML. Embodiments with these complex files include open-source tools such as a molecular/sequence editor to generate, edit and annotate an IMDP file.

Lastly, file management features such as archiving, querying and data retrieval are included in embodiments. These include methods and systems to organize and store IMDP files in a relational database. They also include meta structure fields that may be used to index the contents of an IMDP file. Version control systems are also available for the IMDP file format.

Based on the foregoing, it should be appreciated that the various embodiments of the claimed subject matter include file formats, methods and computer program products for representing graphical and non graphical information in a single file. The above specification, examples and data provide a complete description of the manufacture and use of the composition of the claimed subject matter. Since many embodiments can be made without departing from the spirit and scope of the subject matter, the inventions described reside in the claims hereinafter appended.

What is claimed is:

1. A computer implemented method for transforming multiple data types into a single structured document, the method comprising the step of transforming two or more data types into a single structure document to obtain the single structured document stored in a computer readable medium comprised of:
a three dimensional structured object component comprising the vector coordinate, and object element type description of a representation of at least one three dimensional object; and
a user configured viewing component comprising data representing the three dimensional structured object component's view attributes
wherein the graphic component and the viewing component are jointly stored in a single file which can be accessed and viewed by a structured document viewer
wherein said viewer may output the stored one or more views without user input and wherein said viewer may allow one or more single user actionable transitions to other stored views to thereby transform multiple data types into a structured document stored in a computer readable medium, and
wherein the structured document is comprised of a single multi view file and
wherein at least one of the three dimensional objects is a three dimensional representation of a biological or chemical molecule; and
wherein the at least one attribute in said structured document is a view other than an initial view of an animation that can be interactively manipulated by the user via a browser graphical user interface; and
wherein the structured document is a binary file viewable on at least one computing platform with a different order of Endians having a structured document viewer without any modification of the structured document prior to being viewed on the structured document viewer.

2. The computer implemented method of claim 1, wherein the document is stored with at least one other structured document in a relational database which can be indexed and searched.

3. The computer implemented method of claim 1, wherein the user configured viewing component is selected from the group comprising rotation, translation, view angle, lighting, colors, specific graphical representations, labels, parameters, graphical representations and colors for each atom, graphical representations and colors for each residue, ball and stick representation, CPK attributes, molecular surface attributes, ribbon attributes, atom label, residue labels, site labels, two dimensional annotations, and three dimensional annotations and combinations thereof.

4. The computer implemented method of claim 1, wherein said structured document is further comprised of at least one attribute defining an initial view when the structured document is initially viewed or interfaced with the structured document viewer.

5. The computer implemented method of claim 1, wherein the structured document is restricted to a single computing platform.

6. The computer implemented method of claim 1, wherein said structured document is further comprised of view attributes with animations and transitions in a parametric definition stored in the structured document and capable of defining viewing rules of animations or movements selected from at least one of the group consisting of rotation around one or more axes, rocking, transitions between viewpoints, changing colors, transparency, clipping, and molecular geometry.

7. The computer implemented method of claim 1, wherein said structured document is further comprised of an instruction for an automatic update from a repository if a newer version of the structured document is available for downloading.

8. The computer implemented method of claim 1, wherein the at least one attribute in said structured document is an initial view of an animation that can be interactively manipulated by the user via a browser graphical user interface.

9. The computer implemented method of claim 1, wherein said structured document is further comprised of one or more parametric animation and movements selected from the group consisting of rotation around different axes, rocking, transitions between viewpoints, changing colors, transparency, clipping, and molecular geometry.

10. The computer implemented method of claim 1, wherein the structured document is indexed by external indexing programs by one of the group consisting of chemical structure, biological sequence, biological structure, 3D shapes and 3D biomolecule structures.

11. The computer implemented method of claim 1, wherein the structured document has predetermined limitations which allow the user to interact with the document or presentation in restricted to one or more parameters set by the author of the file.

12. The computer implemented method of claim 1, wherein the structured document further includes at least one function selected from the group consisting of write protection, version control, and editing rights, and file rights modification.

13. The computer implemented method of claim 1, wherein at least one of the three dimensional objects in said structured document is selected from the group consisting of real property, tangible property, and intangible property.

14. A computer implemented system for viewing and interacting with structured document, the computer implemented system comprising:
   (a) a computational platform with a processor, memory and a storage medium;
   (b) a viewer made up of a graphical user interface; and
   (c) the structured document stored in a computer readable medium comprising non graphical information and graphical information with the vector and coordinate description of a representation of at least one three dimensional object and
   a user configured viewing component comprising data representing the three dimensional structured object component's view,
   wherein the structured document is comprised of a single multi view file; and
   wherein at least one of the three dimensional objects is a three dimensional representation of a biological or chemical molecule; and
   wherein the at least one attribute in said structured document is a view other than an initial view of an animation that can be interactively manipulated by the user via a browser graphical user interface; and
   wherein the structured document is a binary file viewable on at least one computing platform with a different order of Endians having a structured document viewer without any modification of the structured document prior to being viewed on the structured document viewer, and
   wherein the vector and coordinate description are stored jointly with the one or more view attributes or features in the single multi view file, and
   wherein the viewer displays the graphic and non graphic information contained in the structured document allowing the user to interact with said information.

15. The computer implemented system of claim 14 wherein the initial appearance of the graphical user interface is predetermined.

16. The computer implemented system of claim 15 wherein the initial predetermined appearance can be modified by the user.

17. The computer implemented system of claim 14 wherein the graphic information is one or more three dimensional objects in a presentation.

18. The computer implemented system of claim 14 wherein the viewer is compatible with at least one of the operating systems selected from the group consisting of Windows, MacOS, Linux and Unix.

19. The computer implemented system of claim 14 wherein the viewer is a compiled executable program.

20. The computer implemented system of claim 14 wherein the viewer further displays to the user at least one preview of a full view.

21. The computer implemented system of claim 14 wherein the vector and coordinate description of a representation of at least one three dimensional object is the vector and coordinate description of a representation of at least one three dimensional molecule comprised of connectivity and Cartesian coordinates.

22. The computer implemented system of claim 14 wherein the viewer further displays the one or more molecular representations with one or more associated colors.

23. The computer implemented system of claim 14 wherein the non graphical information includes general information about molecular and atomic structure.

24. The computer implemented system of claim 14 wherein the general information about molecular and atomic structure is selected from the group consisting of the van der Waals radii of atoms and atom types of the polymer backbone.

25. A computer implemented method of authoring a structured document file comprising the steps of:
   creating a file for use with a computer readable medium which to store at least one three dimensional object and related non graphical information, the at least one three dimensional object defining a three dimensional rendering, and
   storing the at least one view in a structured document, the structured document comprising:
   the vector and coordinate description of a representation of at least one three dimensional object; and
   a user configured viewing component comprising data representing the three dimensional structured object component's view attributes,
   wherein the vector and coordinate description and the one or more view attributes are jointly stored in a single file which can be accessed and viewed by a structured document viewer, and
   wherein the structured document is comprised of a single multi view file; and
   wherein at least one of the three dimensional objects is a three dimensional representation of a biological or chemical molecule; and
   wherein the at least one attribute in said structured document is a view other than an initial view of an animation that can be interactively manipulated by the user via a browser graphical user interface; and
   wherein the structured document is a binary file viewable on at least one computing platform with a different order of Endians having a structured document viewer without any modification of the structured document prior to being viewed on the structured document viewer.

26. The computer implemented method of claim 25 wherein the structured document file is created based on a rendering to a user of the graphical and non graphical information on a graphical user interface at a certain time upon a trigger event initiated by the user.

27. A computer implemented system for viewing and interacting with structured document of claim 14, wherein the user configured viewing component is selected from the group comprising rotation, translation, view angle, lighting, colors, specific graphical representations, labels, parameters, graphical representations and colors for each atom, graphical representations and colors for each residue, ball and stick representation, CPK attributes, molecular surface attributes, ribbon attributes, atom label, residue labels, site labels, two dimensional annotations, and three dimensional annotations and combinations thereof.

28. A computer implemented method of authoring a structured document file of claim 25, wherein the user configured viewing component is selected from the group comprising rotation, translation, view angle, lighting, colors, specific graphical representations, labels, parameters, graphical representations and colors for each atom, graphical representations and colors for each residue, ball and stick representation, CPK attributes, molecular surface attributes, ribbon attributes, atom label, residue labels, site labels, two dimensional annotations, and three dimensional annotations and combinations thereof.

* * * * *